(12) United States Patent
Yan et al.

(10) Patent No.: US 9,216,808 B2
(45) Date of Patent: Dec. 22, 2015

(54) SELF-RIGHTING FRAME AND AERONAUTICAL VEHICLE

(71) Applicants: Gaofei Yan, Hallandale, FL (US); James Dees, Sunrise, FL (US)

(72) Inventors: Gaofei Yan, Hallandale, FL (US); James Dees, Sunrise, FL (US)

( * ) Notice: Subject to any disclaimer, the term of this patent is extended or adjusted under 35 U.S.C. 154(b) by 0 days.

(21) Appl. No.: 14/751,104

(22) Filed: Jun. 25, 2015

(65) Prior Publication Data

US 2015/0291272 A1 Oct. 15, 2015

Related U.S. Application Data

(60) Division of application No. 14/022,213, filed on Sep. 9, 2013, now Pat. No. 9,067,667, which is a continuation-in-part of application No. 13/096,168, filed on Apr. 28, 2011, now Pat. No. 8,528,854.

(30) Foreign Application Priority Data

Jul. 23, 2010 (CN) .......................... 2010 1 0235257

(51) Int. Cl.
*B64C 27/08* (2006.01)
*B64C 1/08* (2006.01)
*B64C 1/06* (2006.01)
*B64C 17/00* (2006.01)
*A63H 27/00* (2006.01)

(52) U.S. Cl.
CPC ........ *B64C 1/08* (2013.01); *A63H 27/12* (2013.01); *B64C 1/061* (2013.01); *B64C 17/00* (2013.01)

(58) Field of Classification Search
USPC ............... 244/17, 23, 17.11, 119, 8, 17.19; 446/36, 37
See application file for complete search history.

(56) References Cited

U.S. PATENT DOCUMENTS

| | | | |
|---|---|---|---|
| 3,019,555 | A | 2/1962 | Poticha |
| 3,204,891 | A | 9/1965 | Cline |
| 3,213,944 | A | 10/1965 | Ross et al. |
| 4,065,873 | A | 1/1978 | Jones |
| 5,071,383 | A | 12/1991 | Kinoshita |
| 5,645,248 | A | 7/1997 | Campbell |
| 6,550,715 | B1 | 4/2003 | Reynolds et al. |
| 7,273,195 | B1 | 9/2007 | Golliher |
| 8,033,498 | B2 | 10/2011 | Blackburn |
| 9,061,558 | B2 | 6/2015 | Kalantari et al. |
| 2006/0121818 | A1 | 6/2006 | Lee et al. |
| 2009/0215355 | A1 | 8/2009 | Elson et al. |
| 2010/0120321 | A1 | 5/2010 | Rehkemper et al. |
| 2010/0224723 | A1 | 9/2010 | Apkarian |
| 2014/0319266 | A1 | 10/2014 | Moschetta |

*Primary Examiner* — Christopher P Ellis

(74) *Attorney, Agent, or Firm* — Allen D. Hertz, P.A.; Allen D. Hertz

(57) ABSTRACT

An aeronautical vehicle that rights itself from an inverted state to an upright state has a self-righting frame assembly has an apex preferably at a top of a central vertical axis. The apex provides initial instability to begin a self-righting process when the vehicle is inverted on a surface. A lift and stabilization panel extends across an upper portion of said frame to provide lift, drag and/or stability. A propulsion system can be located within a central void of the frame assembly and oriented to provide a lifting force. An electronics assembly is also carried by the self-righting frame for receiving remote control commands and is communicatively interconnected to the power supply for remotely controlling the aeronautical vehicle to take off, to fly, and to land on a supporting surface. The frame provides self-righting functionality and protection of elements carried therein.

21 Claims, 24 Drawing Sheets

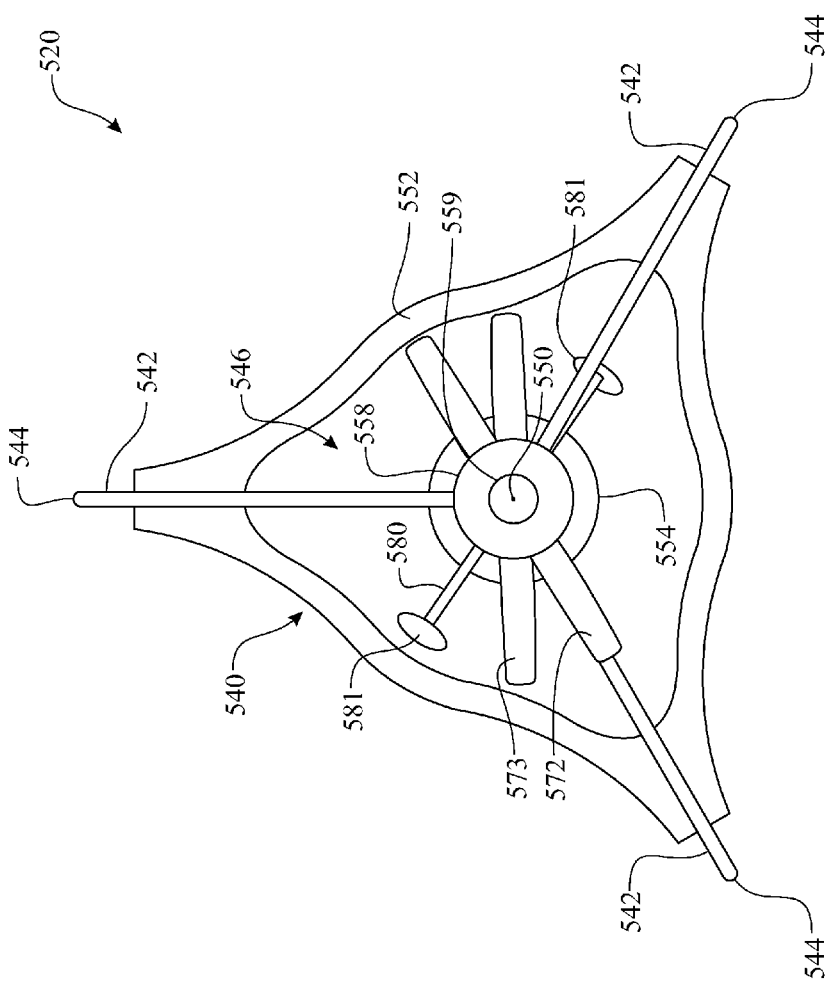

SELF-RIGHTING FRAME AND AERONAUTICAL VEHICLE

CROSS-REFERENCE TO RELATED APPLICATION

This Non-Provisional Utility Patent Application is a Divisional Application claiming the benefit of U.S. Non-Provisional patent application Ser. No. 14/022,213 filed on Sep. 9, 2013, which is scheduled to issue as U.S. Pat. No. 9,067,667 on Jun. 30, 2015, which is a Continuation-in-Part Application claiming the benefit of U.S. Non-Provisional patent application Ser. No. 13/096,168 filed on Apr. 28, 2011, which issued as U.S. Pat. No. 8,528,854 on Sep. 10, 2013, which claims the benefit of co-pending Chinese Patent Application Serial No. 201010235257.7, filed on Jul. 23, 2010, both of which are incorporated herein in their entireties.

FIELD OF THE INVENTION

The present disclosure generally relates to apparatuses and methods for a frame and the construction of a frame that rights itself to a single stable orientation. More particularly, the present disclosure relates to an ovate frame that rights itself to an upright orientation regardless of the frame's initial orientation when placed on a surface.

BACKGROUND OF THE INVENTION

Remote controlled (RC) model airplanes have been a favorite of hobbyists for many years. Initially, in the early years of RC aircraft popularity, the radio controls were relatively expensive and required a larger model aircraft to carry the weight of a battery, receiver and the various servos to provide the remote controllability for the model aircraft. These aircraft were typically custom built of lightweight materials, such as balsa wood, by the hobbyist. Consequently, these RC models represented a significant investment of the hobbyist's time, effort, experience, and money. Further, because of this investment, the hobbyist needed a high degree of expertise in flying the model aircraft to conduct safe operations and prevent crashes. In the event of a crash, most models would incur significant structural damage requiring extensive repairs or even total rebuilding of the model. For these reasons, participation in this hobby was self-restricting to the few who could make the required investments of time and money.

As innovations in the electronics industry resulted in smaller and less inexpensive electronics, the cost and size of radio control units were also reduced allowing more hobbyists to be able to afford these items. Further, these advances also result in reductions in weight of the battery, receiver and servos, which benefits could then be realized in smaller and lighter model airframes. This meant that the building of the airframes could become simpler and no longer requiring the degree of modeling expertise previously required. Simplicity of construction and durability of the airframes were further enhanced with the advent of more modern materials, such as synthetic plastics, foams, and composites, such that the airframes could withstand crashes with minimal or even no damage.

These RC models were still based upon the restraints of airplane aerodynamics meaning they still needed a runway for takeoffs and landings. While the length of the required runways (even if only a relatively short grassy strip) vary according to the size of the RC model, the requirement often relegated the flying of these models to designated areas other than a typical back yard. Model helicopters, like the full-scale real life aircraft they are based upon, do not require runways and can be operated from small isolated areas. However, a helicopter with a single main rotor requires a tail rotor, whether full scale or model, also requires a tail rotor to counter the rotational in flight moment or torque of the main rotor. Flying a helicopter having a main rotor and a tail rotor requires a level of expertise that is significantly greater than required for a fixed wing aircraft, and therefore limits the number of hobbyists that can enjoy this activity.

The complexity of remotely flying a model helicopter has at least been partially solved by small prefabricated models that are battery operated and employ two main counter-rotating rotors. The counter-rotation of the two rotors results in equal and counteracting moments or torques applied to the vehicle and therefore eliminating one of the complexities of piloting a helicopter-like vertical take-off and landing model. These models typically have another limiting characteristic in that the form factor of the structure and the necessary placement of the rotors above the vehicle structure result in a tendency for the vehicle to be prone to tipping on one or the other side when landing. In the event of this occurring, the vehicle must be righted in order for further operations and thus requires the operator or other individual to walk to the remote location of the vehicle and right it so that the operator can again command the vehicle to take off.

Therefore, a self-righting structural frame and corresponding vertical take-off vehicle design is needed to permit remote operation of a helicopter-like RC model without the need to walk to a landing site to right the vehicle in the event the previous landing results in a vehicle orientation other than upright.

SUMMARY OF THE INVENTION

The present disclosure is generally directed to an aeronautical vehicle that rights itself from an off-kilter, an off-seated, or an inverted state to an upright state, the aeronautical vehicle incorporating:
  a self-righting frame assembly comprising:
  a frame structure comprising one of:
  a) at least one generally vertically oriented frame member having an generally uninterrupted, continuous peripheral edge between a top portion and a base portion, and at least one generally horizontally oriented frame, said at least one generally vertically oriented frame member and said at least one generally horizontally oriented frame being mechanically coupled to one another at each intersecting location, said at least one generally vertically oriented frame member and said at least one generally horizontally oriented frame defining a central void, said at least one generally vertically oriented frame member and said at least one generally horizontally oriented frame being arranged in a fixed spatial relationship, or
  b) at least two vertically oriented frame members in registration with a plane extending radially outward from a central vertical axis of said self-righting frame assembly, said at least two vertically oriented frame members having an generally uninterrupted, continuous peripheral edge between a top portion and a base portion, said at least two vertically oriented frame members defining a central void, said at least two vertically oriented frames being arranged in a fixed spatial relationship;

a lift and stabilization panel carried by a segment of an upper region of said frame structure, said lift and stabilization panel, said lift and stabilization panel providing at least one of:
   enhanced stability during any motion;
   lift when said frame assembly is moving in a generally horizontal motion;
   drag when said frame assembly is moving in a generally vertical motion;
a weighted mass carried by a lower section of the frame assembly for the purpose of positioning a center of gravity of the frame assembly proximate to a bottom of the frame assembly; and
an apex formed at a top of the at least one generally vertically oriented frame member for providing an initial instability to begin a self-righting process when the frame assembly is off-kilter; wherein:
when the frame assembly is off-kilter and resting on a frame assembly supporting surface, the frame assembly contacts the frame assembly supporting surface at the apex and at a point on at least one of the at least one generally vertically oriented frame member and further wherein the apex extends from the top of the at least one generally vertically oriented frame member a distance such that a central axis of the at least one generally vertically oriented frame member is sufficiently angulated from vertical to horizontally displace the center of gravity beyond the point of contact of the at least one vertical frame thereby producing a righting moment to return the frame assembly to an upright equilibrium position,
at least one propulsion system carried by at least one generally vertically oriented frame member and extending into the central void of the self-righting frame assembly, the at least one propulsion system oriented to provide a lifting force;
   a power supply carried by the self-righting frame assembly and operationally connected to the at least one propulsion system for operatively powering the at least one propulsion system; and
   an electronics assembly carried by the self-righting frame for receiving remote control commands and communicatively interconnected to the power supply for remotely controlling the aeronautical vehicle to take off, to fly, and to land on a frame assembly supporting surface.

In another aspect, the at least one generally vertically oriented frame member and the at least one generally horizontally oriented frame member is oriented at a substantially perpendicular angle one to the other.

In another aspect, the each of the at least one generally vertically oriented frame member is shaped having at least one of:
   a width dimension, wherein the width dimension is defined as a dimension between the central vertical axis and the radially outer edge of the vertical frame, wherein a height dimension is less than or equal to twice the width dimension,
   a semi-elliptical shape and further wherein the elliptical shape has a horizontal major axis and a vertical minor axis, and
   a semi-circular shape.

In another aspect, the self-righting frame assembly includes at least two vertically oriented frames defining a central void and having a central vertical axis. At least one horizontally oriented frame is desired and would be affixed to the vertical frames extending about an inner periphery of the vertical frames for maintaining the vertical frames at a fixed spatial relationship. The at least one horizontally oriented frame provides structural support, allowing a reduction in structural rigidity of the vertical frames. It is understood the at least one horizontally oriented frame can be omitted where the vertical frames are sufficiently designed to be structurally sound independent thereof. A weighted mass is mounted within the frame assembly and positioned proximate to a bottom of the frame assembly along the central vertical axis for the purpose of positioning the center of gravity of the frame assembly proximate to the bottom of the frame assembly. At a top of the vertical axis, it is desirous to include a protrusion extending above the vertical frames for providing an initial instability to begin a self-righting process when the frame assembly is inverted. It is understood that the protrusion may be eliminated if the same region on the self-righting frame assembly is design to minimize any supporting surface area to provide maximum instability when placed in an inverted orientation. When the frame assembly is inverted and resting on a frame assembly supporting surface, the frame assembly contacts the frame assembly supporting surface at the protrusion and at a point on at least one of the vertical frames. The protrusion extends from the top of the vertical axis and above the vertical frames a distance such that the central axis is sufficiently angulated from vertical to horizontally displace the center of gravity beyond the point of contact of the vertical frame and thereby producing a righting moment to return the frame assembly to an upright equilibrium position.

In another aspect, an aeronautical vehicle that rights itself from an inverted state to an upright or kilter state has a self-righting frame assembly including a protrusion extending upwardly from a central vertical axis. The protrusion provides an initial instability to begin a self-righting process when the aeronautical vehicle is inverted on a frame assembly supporting surface. At least one rotor is rotatably mounted in a central void of the self-righting frame assembly and oriented to provide a lifting force. A power supply is mounted in the central void of the self-righting frame assembly and operationally connected to the at least one rotor for rotatably powering the rotor. An electronics assembly is also mounted in the central void of the self-righting frame for receiving remote control commands and is communicatively interconnected to the power supply for remotely controlling the aeronautical vehicle to take off, to fly, and to land on a frame assembly supporting surface.

In still another aspect, an aeronautical vehicle that rights itself from an off-kilter, an off-seated, or an inverted state to an upright state has a self-righting frame assembly including at least two vertically oriented intersecting elliptical frames. The terms off-kilter, off-seated, and inverted refer to a condition where the aeronautical vehicle is not resting on a aeronautical vehicle supporting surface in a desired state or in a proper orientation. The frames define a central void and each frame has a vertical minor axis and a horizontal major axis wherein the frames intersect at their respective vertical minor axes. Two horizontally oriented frames are affixed to the vertical frames and extend about an inner periphery of the vertical frames for maintaining the vertical frames at a fixed spatial relationship. A weighted mass is positioned within the frame assembly along the central vertical axis and is affixed proximate to a bottom of the frame assembly for the purpose of positioning a center of gravity of the aeronautical vehicle proximate to a bottom of the frame assembly. At a top of the vertical axis a protrusion, at least a portion of which has a spherical shape, extends above the vertical frames for providing an initial instability to begin a self-righting process when the aeronautical vehicle is inverted on a frame assembly supporting surface. When the aeronautical vehicle is inverted and resting on a frame assembly supporting surface, the frame assembly contacts the frame assembly supporting surface at the protrusion and at a point on at least one of the vertical frames. The protrusion extends from the top of the vertical axis and above the vertical frames a distance such that the central axis is sufficiently angulated from vertical to horizontally displace the center of gravity beyond the point of contact of the vertical frame thereby producing a righting moment to return the frame assembly to an upright equilibrium position. At least two rotors are rotatably mounted in the void of the self-righting frame assembly. The two rotors are co-axial along the central axis and counter-rotating one with respect to the other. The rotors are oriented to provide a lifting force, each rotor being substantially coplanar to one of the horizontal frames. A power supply is mounted in the weighted mass and operationally connected to the rotors for rotatably powering the rotors. An electronics assembly is also mounted in the weighted mass for receiving remote control commands and is communicatively interconnected to the power supply for remotely controlling the aeronautical vehicle to take off, to fly, and to land on a frame assembly supporting surface.

In another aspect, the self-righting aeronautical vehicle can be designed for manned or unmanned applications. The self-righting aeronautical vehicle can be of any reasonable size suited for the target application. The self-righting aeronautical vehicle can be provided in a large scale for transporting one or more persons, cargo, or smaller for applications such as a radio-controlled toy.

In another aspect, the one propulsion system further comprising at least one aerodynamic rotor or horizontally oriented propeller, wherein the at least one aerodynamic rotor is located within the central void of the self-righting frame assembly.

In another aspect, the one propulsion system further comprising a second aerodynamic rotor, wherein the second aerodynamic rotor is located within the central void of the self-righting frame assembly, wherein the first aerodynamic rotor rotates in a first direction and the second aerodynamic rotor rotates in a second, opposite direction.

In another aspect, the self-righting frame assembly comprises:
  at least two vertically oriented frame members in registration with a plane extending radially outward from a central vertical axis of the self-righting frame assembly, the frame members having an uninterrupted, continuous peripheral edge between a top portion and a base portion, the frames defining a central void, the at least two vertically oriented frames being arranged in a fixed spatial relationship;
  a weighted mass at a lower section of the frame assembly for the purpose of positioning a center of gravity of the frame assembly proximate to a bottom of the frame assembly; and
  an apex formed at a top of the vertical axis at an upper portion of the vertical frames for providing an initial instability to begin a self-righting process when the frame assembly is inverted; wherein:
  when the frame assembly is inverted and resting on a frame assembly supporting surface, the frame assembly contacts the frame assembly supporting surface at the apex and at a point on at least one of the vertical frames and further wherein the apex extends from the top of the vertical axis and above the vertical frames a distance such that the central axis is sufficiently angulated from vertical to horizontally displace the center of gravity beyond the point of contact of the at least one vertical frame thereby producing a righting moment to return the frame assembly to an upright equilibrium position.

In another aspect, the at least two vertically oriented frames are oriented substantially at equal angles one to the other such that their intersection defines the central vertical axis.

In another aspect, the vertical frames define a substantially continuous outer curve about a periphery thereof.

In another aspect, the vertical frames are shaped having at least one of:
  a width dimension, wherein the width dimension is defined as a dimension between the central vertical axis and the radially outer edge of the vertical frame, wherein a height dimension is less than or equal to twice the width dimension,
  a semi-elliptical shape and further wherein the elliptical shape has a horizontal major axis and a vertical minor axis, and
  a semi-circular shape.

In another aspect, the frame structure is designed to self-right the frame assembly when the frame assembly is placed in an off-kilter, an off-seated, or an inverted orientation on the aeronautical vehicle supporting surface.

In another aspect, the frame can be utilized for any application desiring a self-righting structure. This can include any general vehicle, a construction device, a rolling support, a toy, and the like.

In another aspect, the frame can be utilized to protect operational components, including the propulsion system, power supply, electrical assembly, and the like.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which:

FIG. 24 presents a top plan view of the third exemplary embodiment of an aeronautical vehicle.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
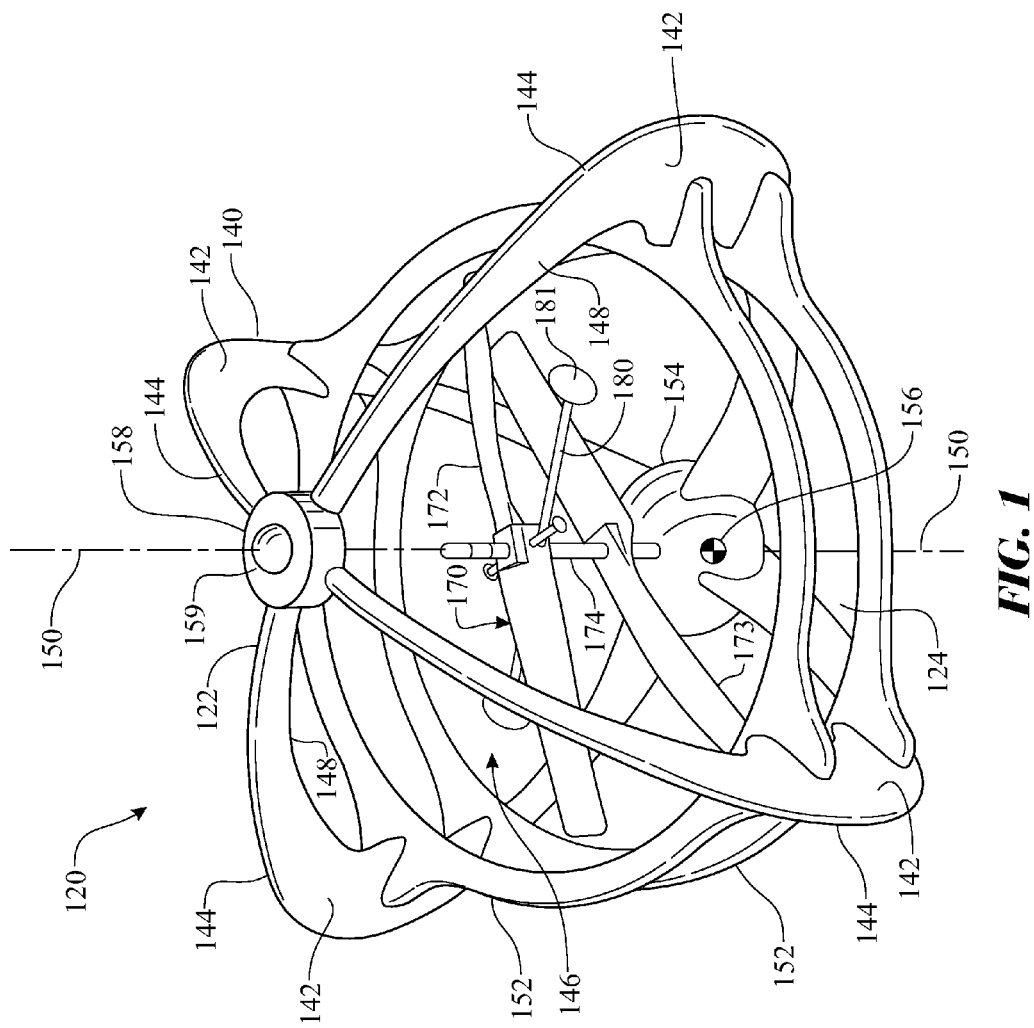
FIG. 1 presents an isometric view of an aeronautical vehicle having a self-righting frame according to the present invention.

A remotely controlled aeronautical vehicle 120 in accordance with a first exemplary embodiment is introduced in the illustration shown in FIG. 1. The remotely controlled aeronautical vehicle 120 employs a self-righting structural frame 140 and illustrates its various components.

Referring now to FIGS. 1-6, the aeronautical vehicle 120 and more particularly, the self-righting frame assembly 140 includes at least two substantially identical vertically oriented frames 142 arranged in an intersecting manner such that the axis of their intersection also defines a central vertical axis 150 of the self-righting frame assembly 140. The substantially identical vertically oriented frames 142 are further oriented one with respect to the other to substantially define equal angles about an outer periphery of the self-righting frame assembly 140.

Each substantially identical vertically oriented frame 142 defines an outer edge 144 having a continuous outer curve about a periphery of the respective vertically oriented frame 142. The substantially identical vertically oriented frames 142 may have a circular shaped outer curve 144, but in a most preferred embodiment, substantially identical vertically oriented frames 142 have an elliptical shape wherein the major axis (represented by dimension "a" 186 of FIG. 2) is the horizontal axis of the substantially identical vertically oriented frames 142 and wherein the minor axis (represented by dimension "b" 187 of FIG. 2) is the vertical axis of the substantially identical vertically oriented frames 142 (i.e., dimension "a" 186 is greater than dimension "b" 187). The substantially identical vertically oriented frames 142 also have an inner edge 148 which, if substantially identical vertically oriented frames 142 were rotated about axis 150, define a central void 146. A bottom edge 124 of the substantially identical vertically oriented frames 142 and thus of the self-righting frame assembly 140 is flattened instead of carrying the elliptical form through to central axis 150. The flattened bottom area 124 of the substantially identical vertically oriented frames 142 contributes to a stable upright equilibrium of the self-righting frame assembly 140.

At least one horizontal frame 152 extends about an inner periphery of the central void 146. In a most preferred embodiment, a pair of horizontal frames 152 extends about the inner periphery of the void 146 and are vertically spaced one from the other. The horizontal frames 152 are affixed to each vertically oriented frame 142 substantially at inner edges 148 of the substantially identical vertically oriented frames 142 and maintain the plurality of substantially identical vertically oriented frames 142 at a desired fixed spatial relationship one to the other, i.e. defining substantially equal angles one frame 142 with respect to an adjacent frame 142.

A weighted mass 154 is positioned within the frame assembly 140 and affixed thereto in a stationary manner. As illustrated, the weighted mass 154 is held captive in a stationary manner proximate to the bottom edge 124 of the plurality of substantially identical vertically oriented frames 142 along central vertical axis 150. While one manner of holding the weighted mass 154 captive is accomplished by the substantially identical vertically oriented frames 142 conforming to an outer periphery of the weighted mass 154, as illustrated. It is understood that other manners of retaining weighted mass 154 can be employed such as using mechanical fasteners, bonding agents such as glue or epoxy, or by other known methods of captive retention known in the industry. The preferred position and weight of the weighted mass 152 is selected to place the combined center of gravity 156 of the aeronautical vehicle 120 as close to the bottom edge 124 of the remotely controlled aeronautical vehicle 120 as possible and at a location preferably within the form factor of the weighted mass 154.

A protrusion 158 is affixed to a top portion 122 of frame assembly 140. The protrusion 158 extends upwardly and exteriorly from outer edge 144 of substantially identical vertically oriented frames 142 and in a preferred embodiment an upper most part of protrusion 158 has a spherical portion 159. In an alternate embodiment, the frame assembly 140 defines an apex. In a configuration including the protrusion 158, the protrusion 158 would preferably be in registration with the apex of the frame assembly 140. Those practiced in the art will readily recognize by the disclosures herein that the protrusion 158 can be any shape that provides for a single point of contact 194 (FIG. 9) at either an apex of the frame assembly 140 or, if included, the protrusion 158 with a frame assembly supporting surface 102 (FIG. 9) when the frame assembly 140 is in a substantially inverted orientation on the frame assembly supporting surface 102 (FIGS. 8-15).

Figure 2:
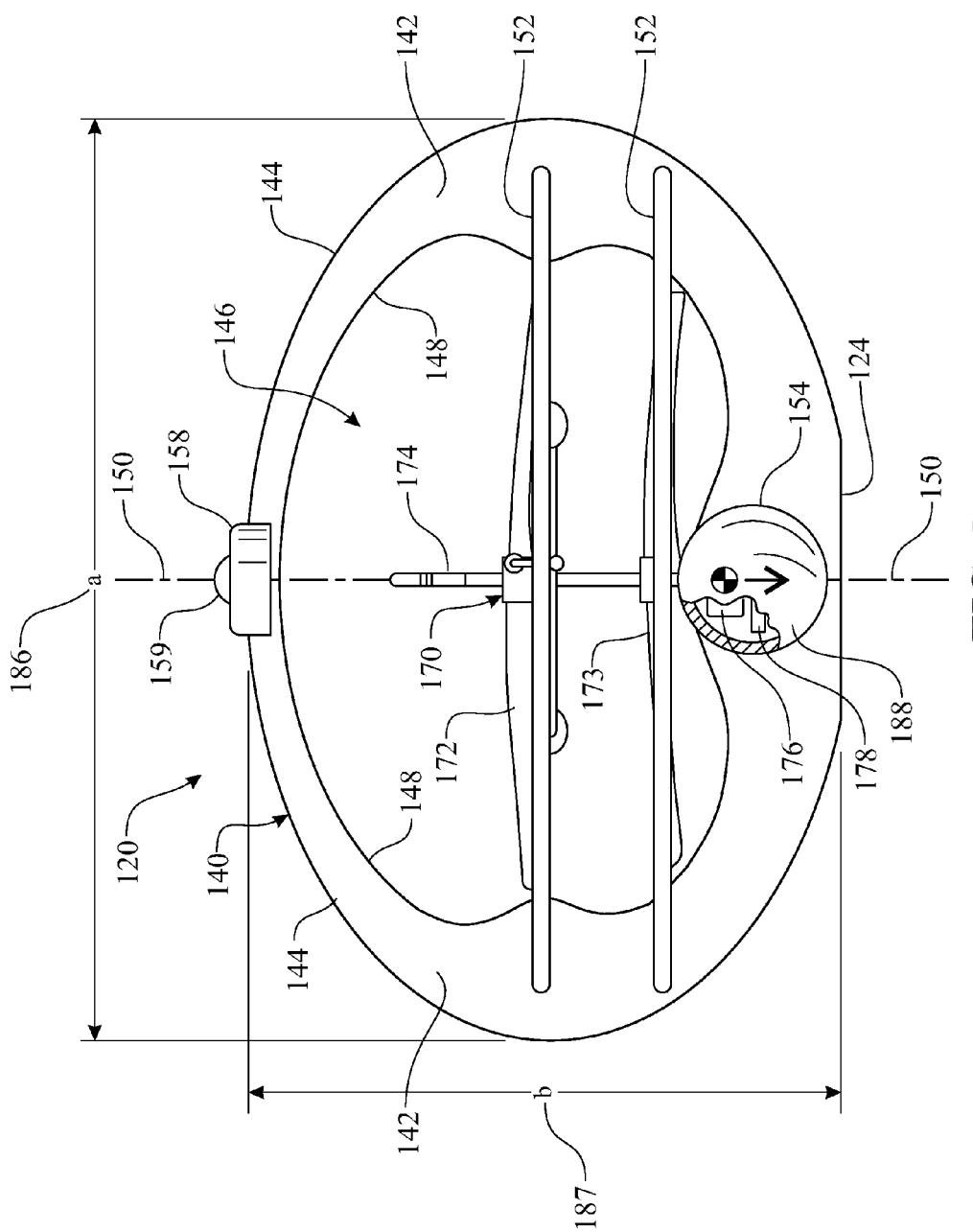
FIG. 2 presents a partially sectioned side elevation view of the aeronautical vehicle.
Figure 6:
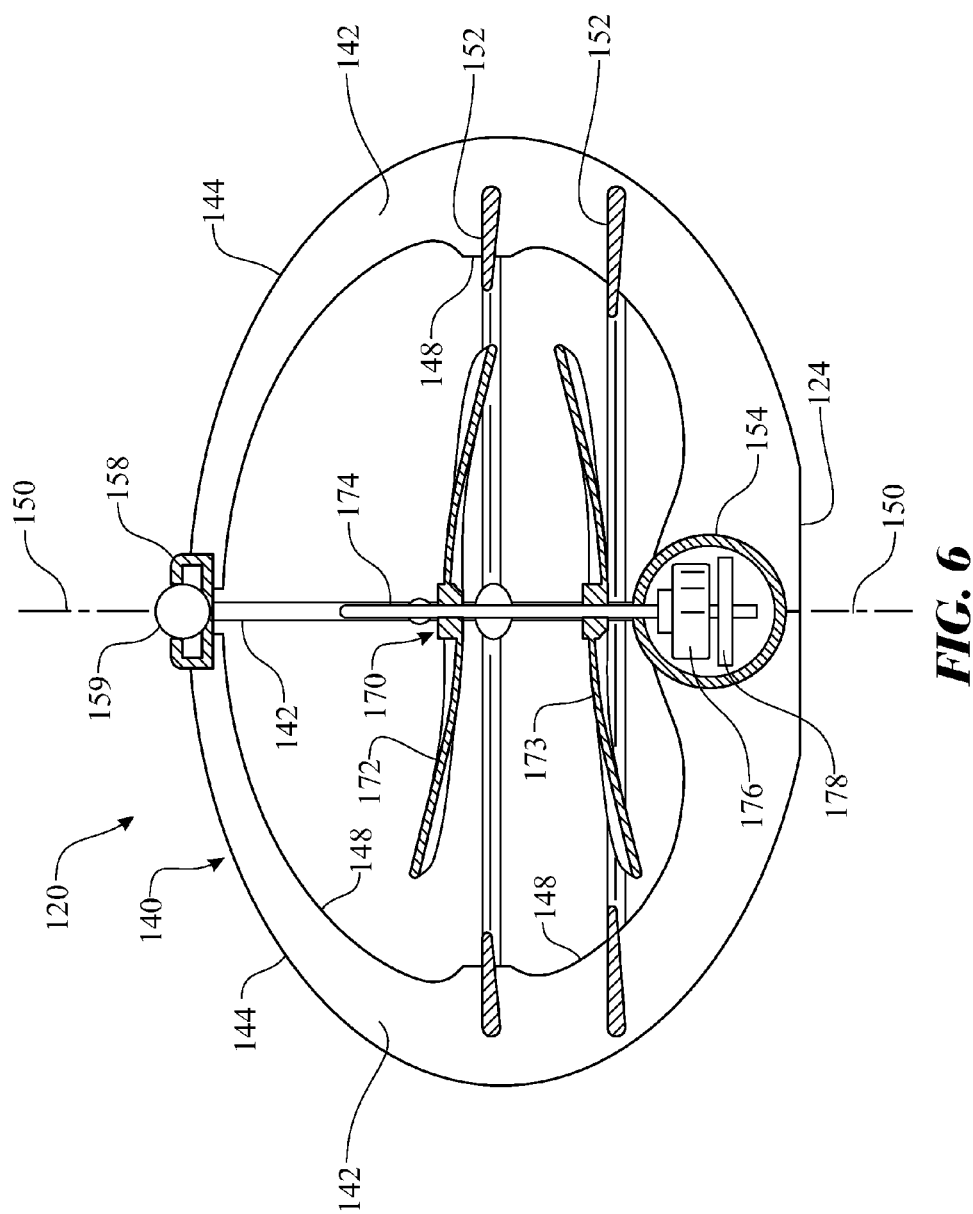
FIG. 6 presents a cross-sectional view of the aeronautical vehicle shown in FIG. 4, taken along the line 6-6 of FIG. 4.

As illustrated in FIGS. 1-6 and particularly in FIGS. 2 and 6, the self-righting frame 140 is easily adapted for use in a Vertical Take-Off and Landing (VTOL) aeronautical vehicle 120, here illustrated as a remotely controlled flyable model. The aeronautical vehicle 120 includes the self-righting frame assembly 140 and further includes a maneuvering and lift mechanism 170 for providing aeronautical lift and maneuvering of aeronautical vehicle 120 during flight operations. The maneuvering and lift mechanism 170 includes a power supply 176 and remote control electronics 178 for powering and controlling aeronautical vehicle 120 in flight operations. The power supply 176 as illustrated comprises an electrical battery and electric motor, however other power configurations utilized for flyable model aeronautical vehicles are also understood. The remote control electronics 178 are capable of receiving remote control radio frequency (RF) signals and translating those signals into control inputs to the power supply 176 for providing directional and velocity controls to the aeronautical vehicle 120. The power supply 176 and electronics 178 are further understood to be substantially the same as or adapted from like mechanisms utilized for remotely controlled helicopters, but may also be of a unique design for the aeronautical vehicle 120 and known to those practiced in the art.

Figure 3:
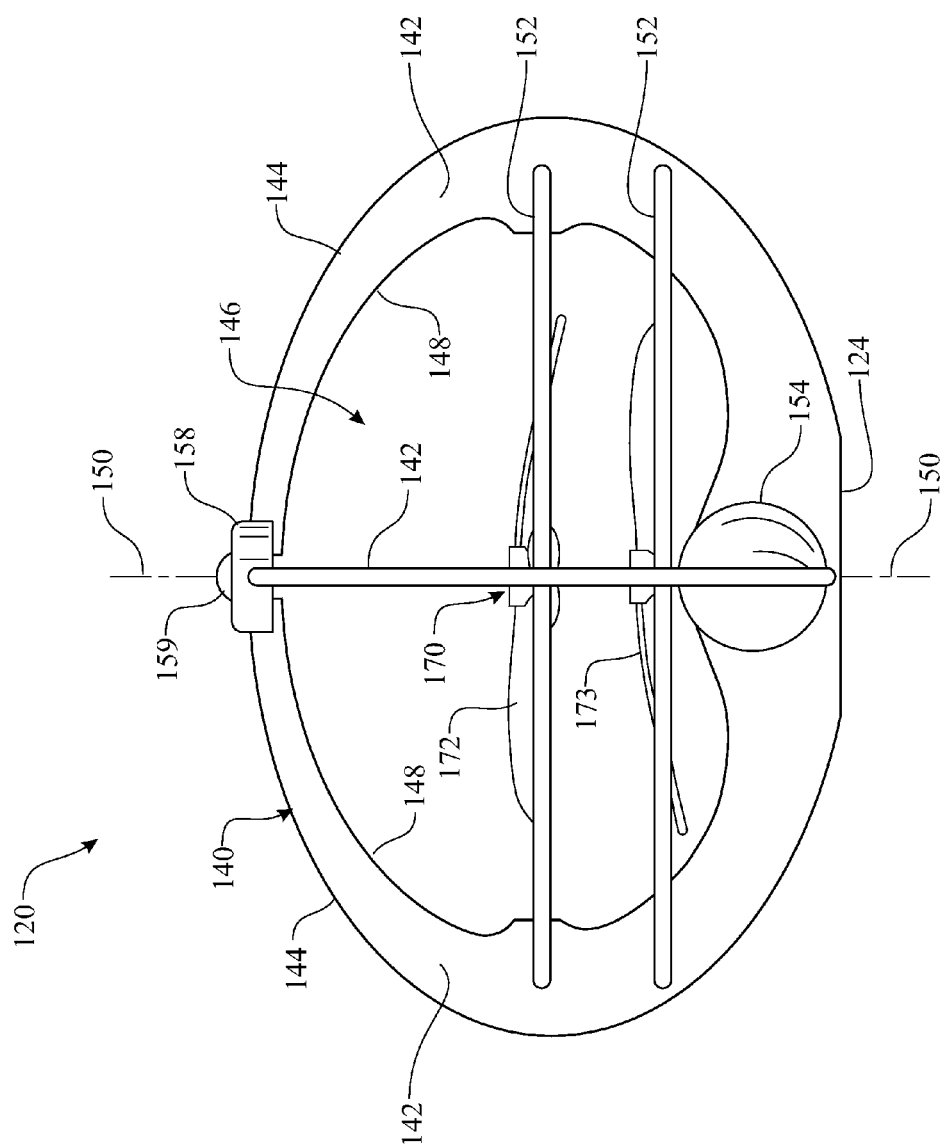
FIG. 3 presents a side elevation view of the aeronautical vehicle.
Figure 4:
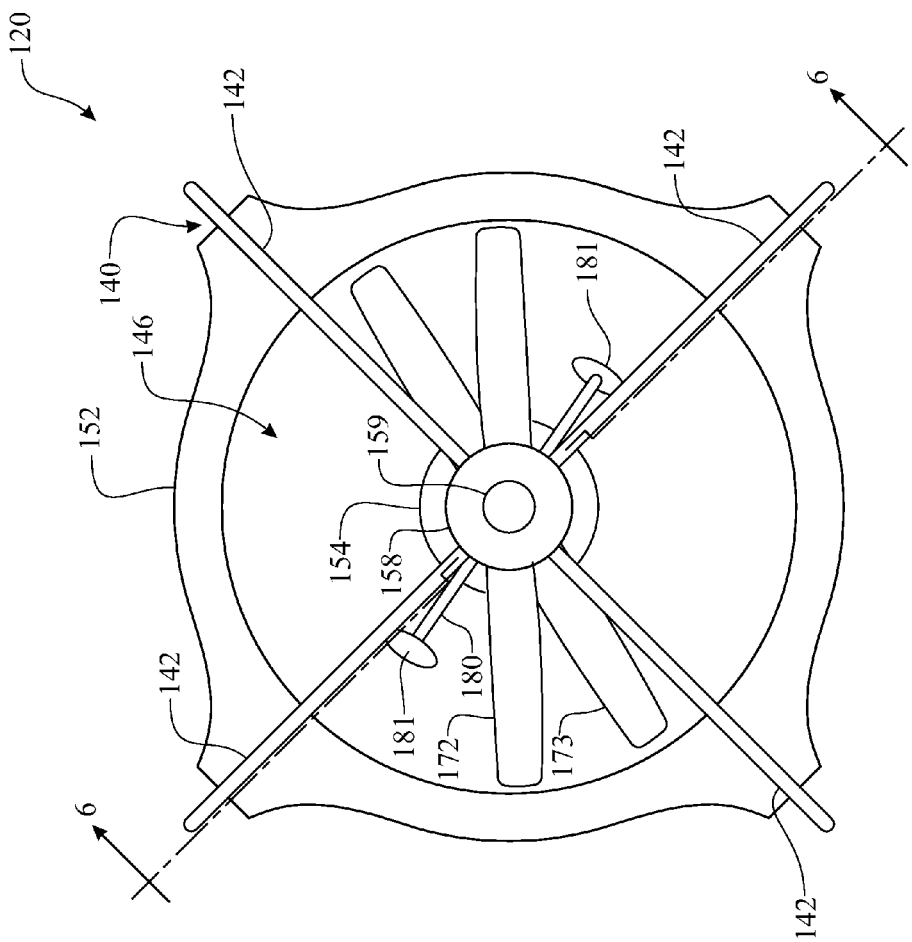
FIG. 4 presents a top plan view of the aeronautical vehicle.
Figure 5:
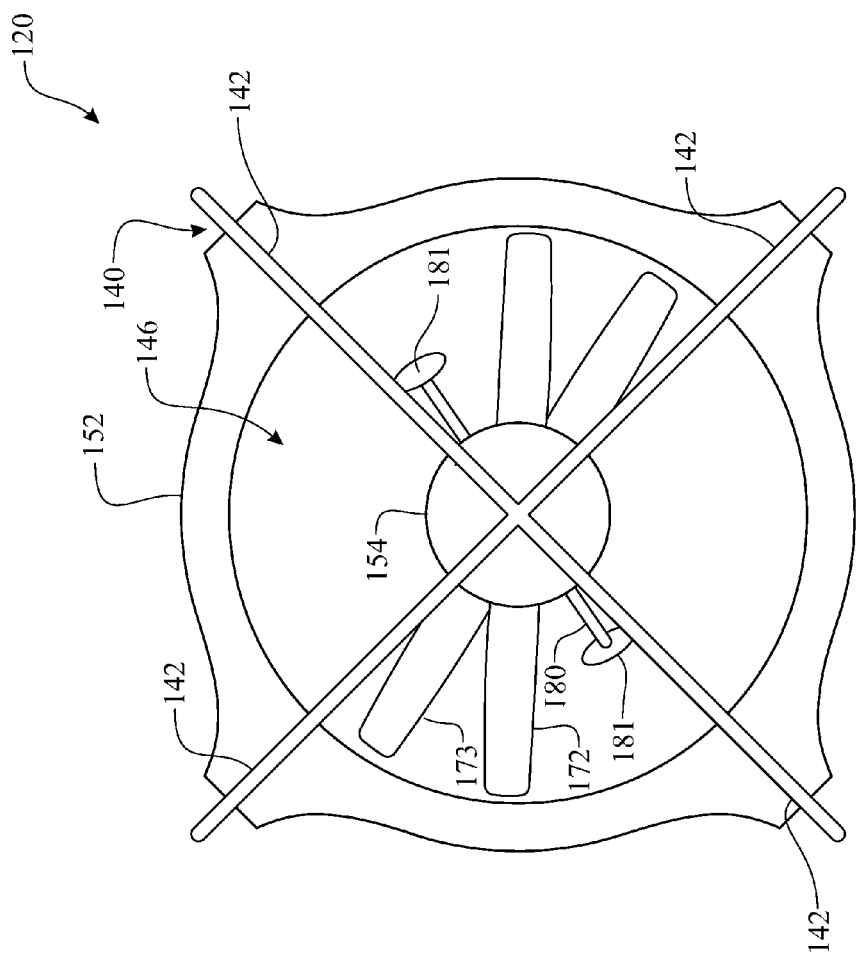
FIG. 5 presents a bottom plan view of the aeronautical vehicle.

The power supply 176 and respective electronics 178 are preferably housed within and contribute to the function of weighted mass 154 as previously described. A rotating mast 174 is connected to the power supply 176, wherein the rotating mast 174 extends upwardly from the weighted mass 154 and is coincident with the central axis 150. At least one aerodynamic rotor 172 is affixed to the rotating mast 174 and, when rotated at a sufficient speed, functions as a rotating airfoil to generate lift to raise the aeronautical vehicle 120 into the air for flying operations. However, as with all aeronautical vehicles employing a rotating aerodynamic rotor to provide lift, the aeronautical vehicle 120 also requires an anti-torque mechanism to maintain the rotational stability of the self-righting frame assembly 140. A preferred embodiment of aeronautical vehicle 120 includes a second aerodynamic rotor 173 that is also rotatably powered by the power supply 176 wherein each rotor 172, 173 is substantially co-planar with a respective horizontal frame 152 as illustrated in FIGS. 2 and 3. However, the second rotor 173 is geared/arranged to rotate in an opposite direction from the first rotor 172 and thus countering the torque produced by the first rotor 172. Such co-axial counter-rotating rotor systems are well known in VTOL design. Other anti-torque systems known in the art and contemplated herein include a single main rotor and a second mechanism such as a smaller rotor at right angles to the main rotor and proximate to a periphery of the frame 140 or dual laterally separated counter-rotating rotors.

The maneuvering and lift mechanism 170 can also include a stabilization mechanism comprising a stabilizer bar 180 having weights 181 at opposite ends thereof also rotatably affixed to mast 174 to rotate in conjunction with the rotors 172, 173. The stabilizer bar 180 and weights 181 during rotation stay relatively stable in the plane of rotation and thus contribute to the flight stability of the aeronautical vehicle 120. The stabilizer bar 180 and weights 181 are of a configuration known in the helicopter design art.

Figure 7:
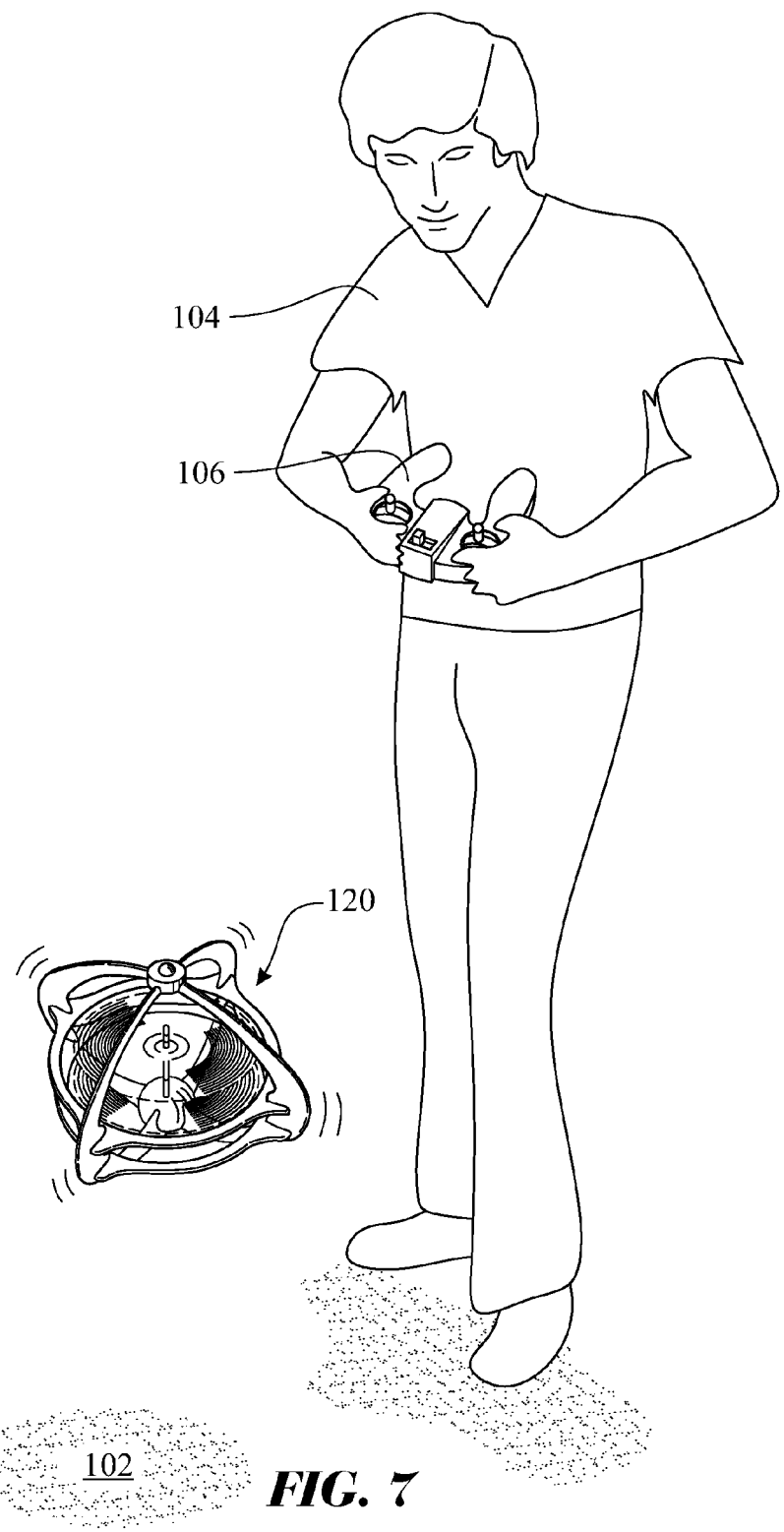
FIG. 7 presents a perspective view of a user remotely operating the aeronautical vehicle.
Figure 16:
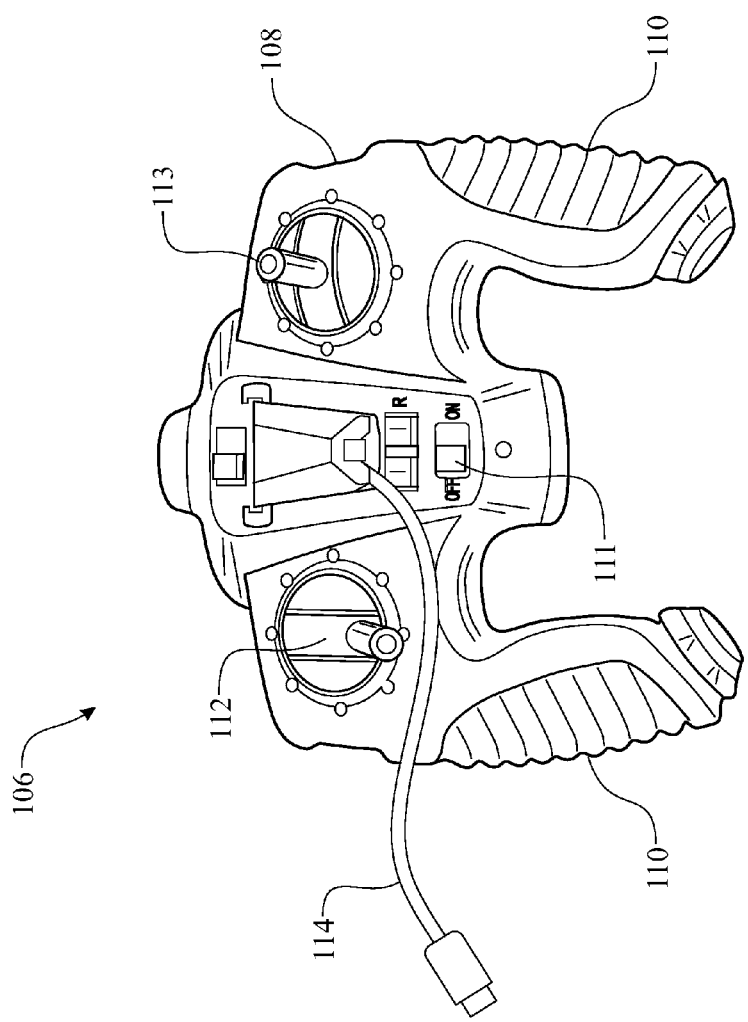
FIG. 16 presents a top perspective view of a representative remote control unit for use by a user for remotely controlling the aeronautical vehicle.
Figure 17:
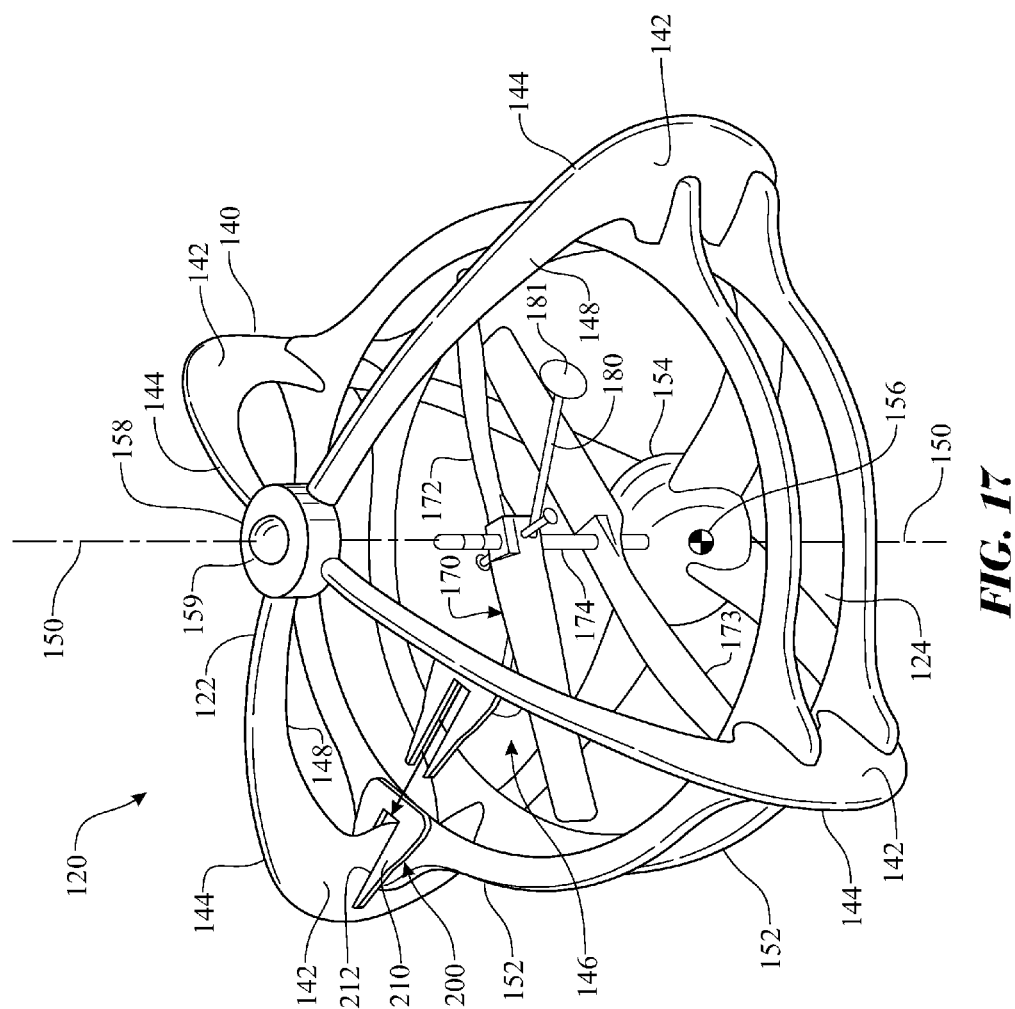
FIG. 17 presents an isometric view of a the aeronautical vehicle, introducing a weight used for directional control thereof during flight.

Referring now to FIGS. 7 and 16, flight operations of the model VTOL aeronautical vehicle 120 are shown wherein a user 104 utilizes a remote hand controller 106 to send control signals to the aeronautical vehicle 120 to take off from and fly above the frame assembly supporting surface 102. The remote hand controller 106, as further shown in FIG. 16, includes a case 108 formed to include handles 110 for grasping by user 104. The case 108 also houses the electronic circuitry (not shown) to generate and transmit the RF control signals for broadcast to aeronautical vehicle 120 to permit the remote controlled flight of the aeronautical vehicle 120. The controller 106 includes a power cord 114 for recharging batteries and various controls such as on-off switch 111 and joy sticks 112, 113 to generate the command signals for vertical and lateral translations of aeronautical vehicle 120 thereby allowing user 104 to control vehicle 120 to take-off, perform flight maneuvers, and land.

During flight operations of a remotely controlled helicopter, one of the major problems occurs when the vehicle tips or lands in other than an upright orientation. In those instances, the user must travel to the location of the vehicle and re-orient the vehicle and then resume operations. The self-righting frame 140 of VTOL aeronautical vehicle 120 causes vehicle 120 to, in the event of other than an upright landing, re-orient itself without the aid of the user.

Figure 8:
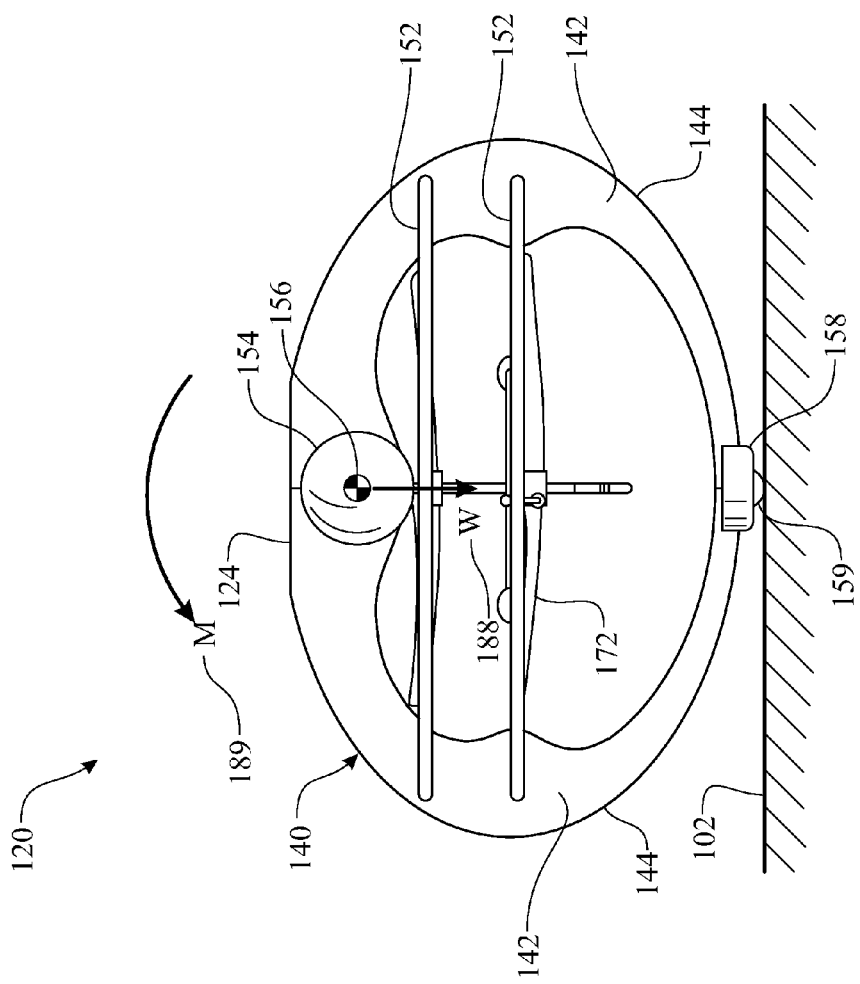
FIG. 8 presents an elevation view of the aeronautical vehicle resting on a frame assembly supporting surface in an inverted orientation.

A worst-case scenario of aeronautical vehicle 120 landing in an inverted orientation and its self-righting sequence is illustrated in FIGS. 8-15 and described herein. In FIG. 8, vehicle 120 has hypothetically landed in a worst-case inverted orientation on frame assembly supporting surface 102 wherein aeronautical vehicle 120 is hypothetically resting on frame assembly supporting surface 102 at a single point of contact of the spherical portion 159 of the protrusion 158. Because of the spherical geometry of portion 159 or other geometry employed such that in an inverted orientation, there is only single point contact such as with a portion 159 being conical, the protrusion 158 imparts an initial instability to the self-righting frame assembly 140. Further, the initial instability is enhanced by the weighted mass 154 positioning the center of gravity 156 opposite most distant from the single point of contact of the portion 159 of the protrusion 158. The initial instability initiates a moment force "M" 189 to begin rotating the remotely controlled aeronautical vehicle 120 about the point of contact of the portion 159 of the protrusion 158.

Figure 9:
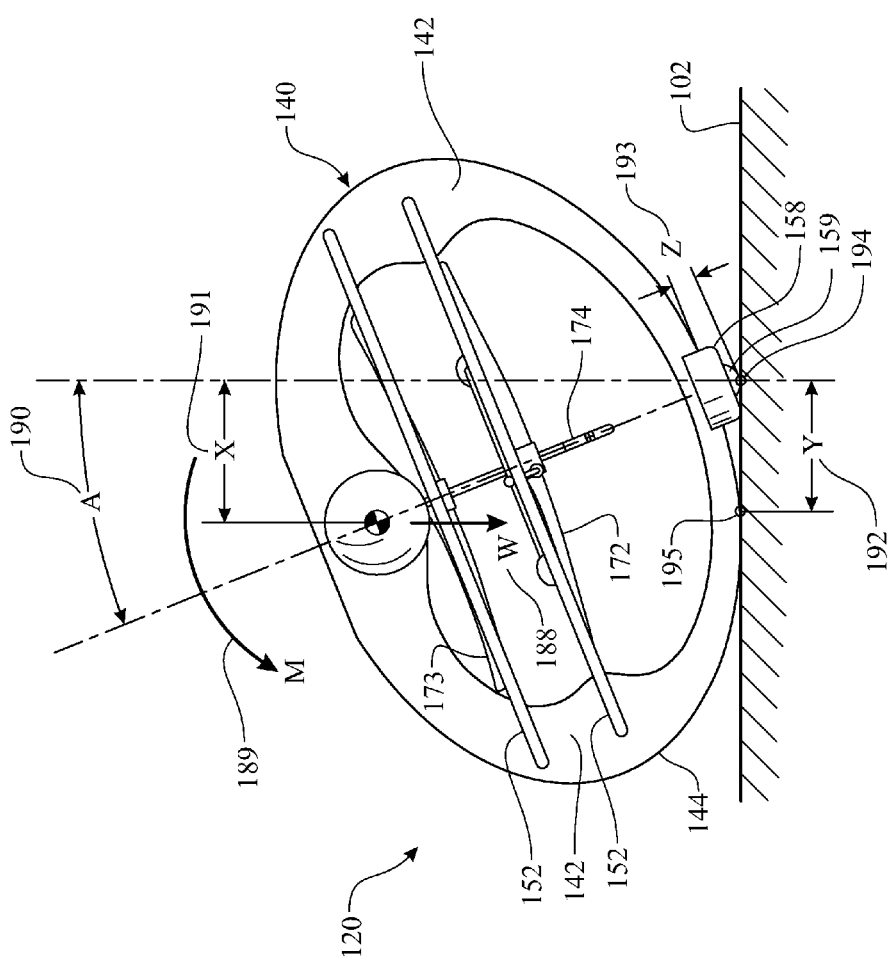
FIG. 9 presents an elevation view of the aeronautical vehicle resting on the frame assembly supporting surface and beginning the process of self-righting itself.

Turning now to FIG. 9, the remotely controlled aeronautical vehicle 120 begins to seek a state of equilibrium from the initial state of instability described with respect to FIG. 8. Those practiced in the mechanical arts will readily recognize that such a state of equilibrium would occur when the self-righting frame assembly 140 contacts the frame assembly supporting surface 102 at three points defining a contact plane with the weight vector 188 of the vehicle 120 vertically projecting within the triangle on the frame assembly supporting surface 102 defined by the three points of contact of frame assembly 140. As illustrated in FIG. 9, the protrusion 158 with the spherical portion 159 extends above the elliptical profile of substantially identical vertically oriented frames 142 a dimensional distance of "Z" 193. As the remotely controlled aeronautical vehicle 120 tips to one side from the protrusion 158, the contact point 194 and the outer edge 144 of substantially identical vertically oriented frames 142 contacts the frame assembly supporting surface 102 at the frame contact points 195. The dimension "Z" 193 extension of protrusion 158 and portion 159 above substantially identical vertically oriented frames 142 results in central axis 150 being angulated from vertical by angle "A" 190.

As illustrated, adjacent substantially identical vertically oriented frames 142 each have a contact point 195 (in FIG. 9, a second frame 142 is hidden behind the illustrated frame 142) such that, as illustrated, a line interconnecting points 195 is orthogonal to the drawing page and forms one leg of a contact triangle defining a contact plane for vehicle 120. The line connecting points 195 is a distance "Y" 192 from contact point 194 of protrusion 158. If the lateral or horizontal displacement of weight vector "W" 188 is such that vector "W" 188 operates through the contact triangle defined by contact point 194 of protrusion 158 and the two contact points 195 of adjacent substantially identical vertically oriented frames 142, an equilibrium state for vehicle 120 is found and it will remain in that state until disturbed into an unstable state. However, as illustrated in FIG. 9, height dimension "Z" is sufficiently large to create angle "A" such that weighted mass 154 and vehicle center of gravity 156 have been horizontally displaced from vertical by a distance "X" 191. Height dimension "Z" is selected to insure that dimension "X" 191 is greater than dimension "Y" 192. Additionally, inertia continues to rotate the remotely controlled aeronautical vehicle 120.

Figure 10:
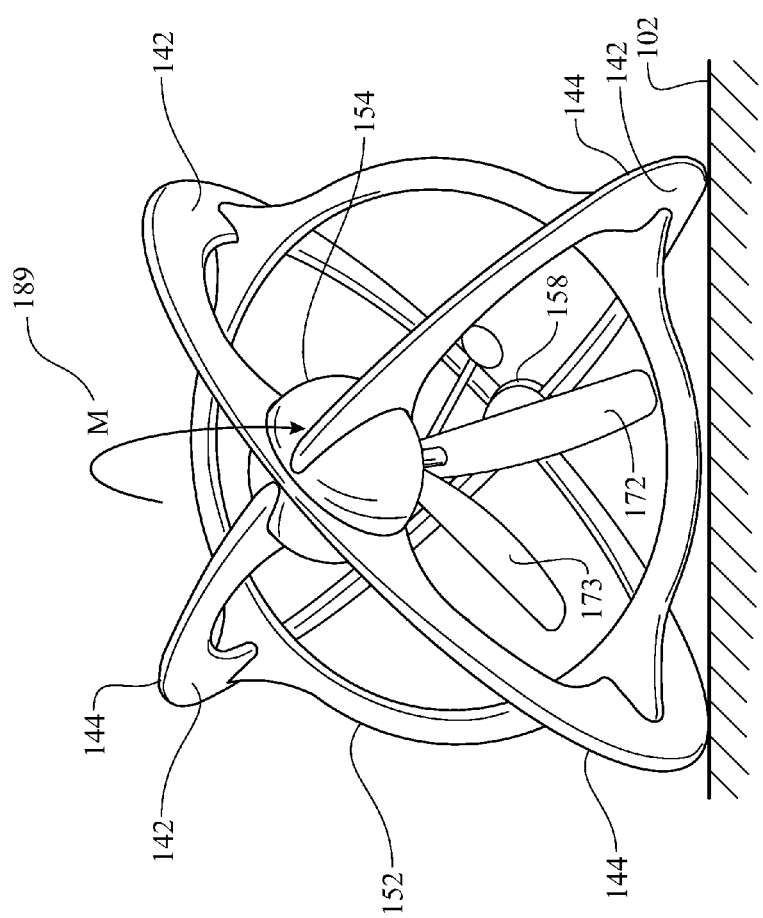
FIG. 10 presents an elevation view of the aeronautical vehicle resting on the frame assembly supporting surface and continuing the process of self-righting itself.
Figure 11:
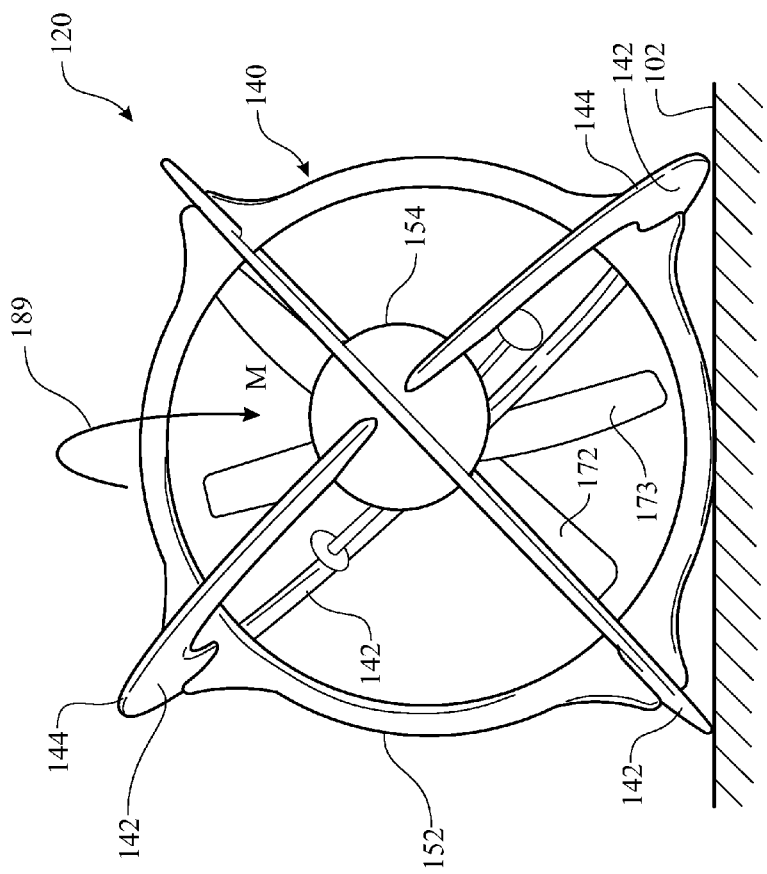
FIG. 11 presents an elevation view of the aeronautical vehicle resting on the frame assembly supporting surface and approximately one-half self-righted.

Turning now to FIG. 10, the vehicle of FIG. 9 is viewed as from the left side of FIG. 9 wherein weighted mass 154 being on the far side of the contact points 195 of FIG. 9 and creating righting moment "M" 189, the remotely controlled aeronautical vehicle 120 follows the righting moment "M" 189 and continues its rotation towards an upright position. Likewise, as illustrated in FIG. 11, the weighted mass 154 approaches the ninety-degree (90°) position of rotation from vertical. Those practiced in the art will readily recognize that an outer periphery of horizontal frame 152 in a preferred embodiment will not engage the frame assembly supporting surface 102 as remotely controlled aeronautical vehicle 120 or self-righting frame assembly 140 rotates across the frame assembly supporting surface 102. In this manner, the self-righting motion caused by the moment "M" 189 will remain continuous and uninterrupted.

Figure 12:
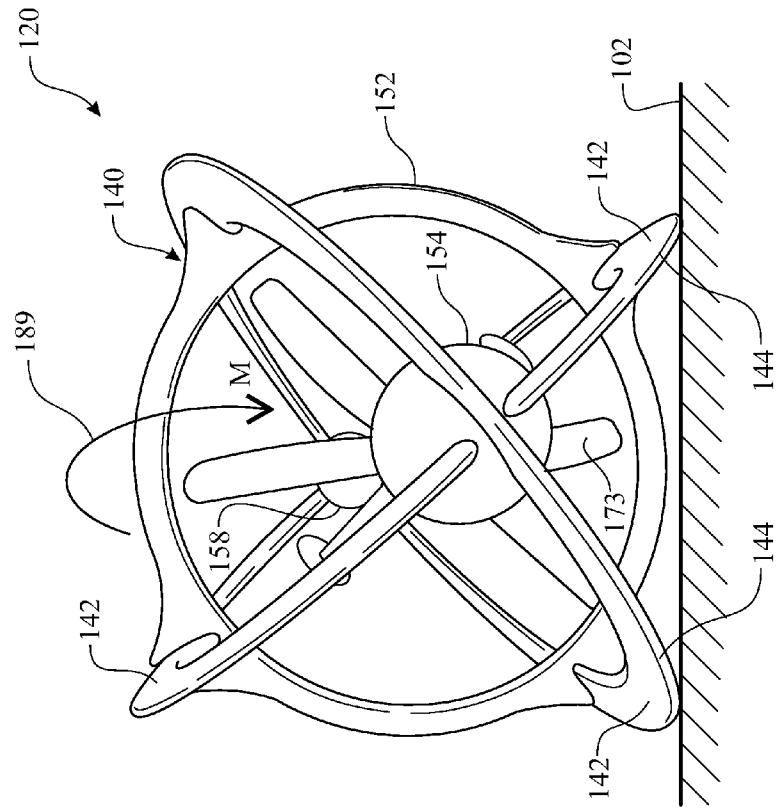
FIG. 12 presents an elevation view of the aeronautical vehicle resting on the frame assembly supporting surface and over one-half self-righted.
Figure 13:
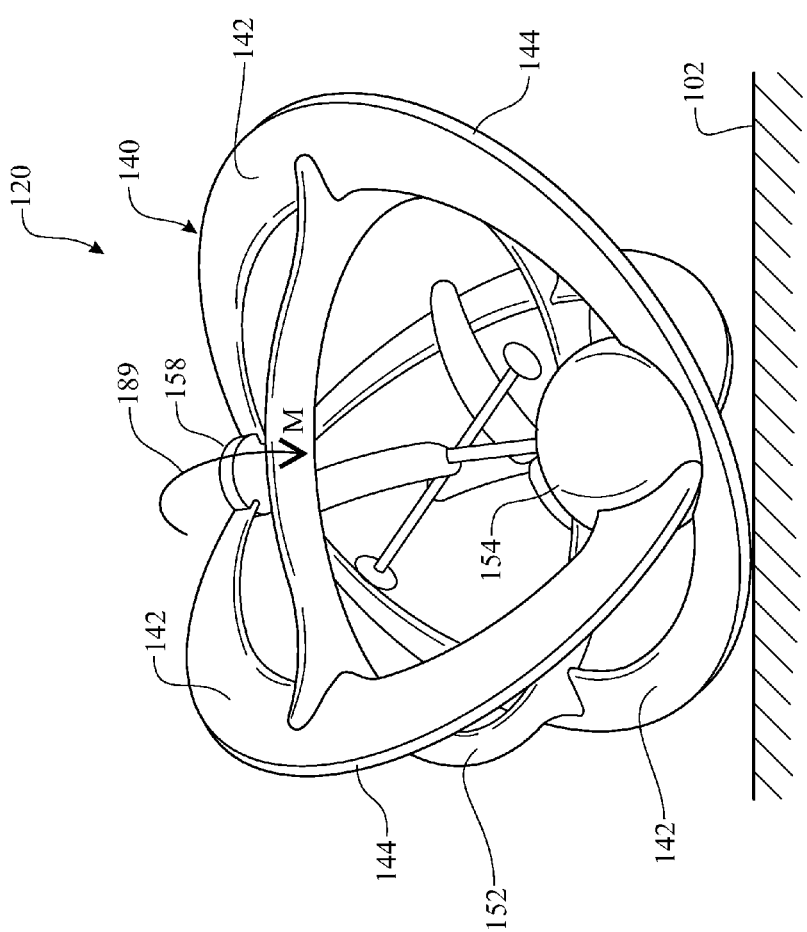
FIG. 13 presents an elevation view of the aeronautical vehicle resting on the frame assembly supporting surface and almost completely self-righted.
Figure 14:
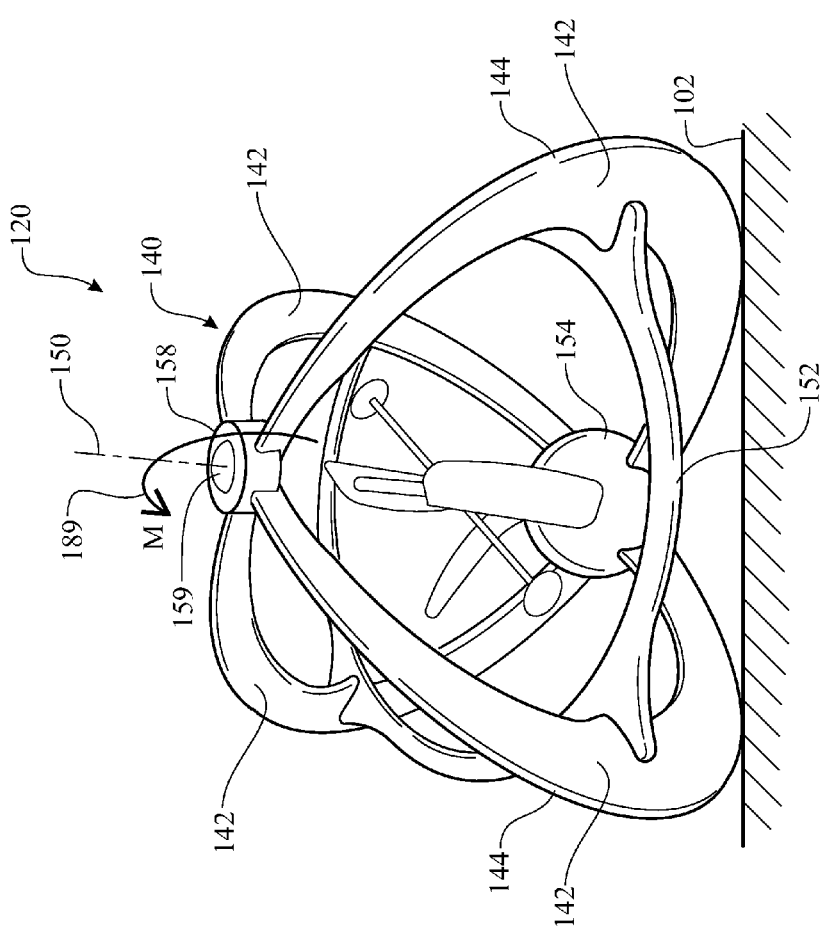
FIG. 14 presents an opposite elevation view of the aeronautical vehicle as shown in FIG. 13 and almost completely self-righted.

Referring now to FIGS. 12-14, the remotely controlled aeronautical vehicle 120 and the self-righting frame assembly 140 continue to rotate toward an upright position with the weighted mass 154 consistently acting beyond the shifting points of contact of the adjacent vertical substantially identical vertically oriented frames 142. In FIG. 12, the weighted mass 154 rotates downwardly from its ninety-degree (90°) position and in FIGS. 13 and 14, the weighted mass 154 approaches a position proximate to the frame assembly supporting surface 102 wherein the remotely controlled aeronautical vehicle 120 is almost upright, FIG. 14 being a one hundred eighty degree (180°) opposing view of FIG. 13.

Figure 15:
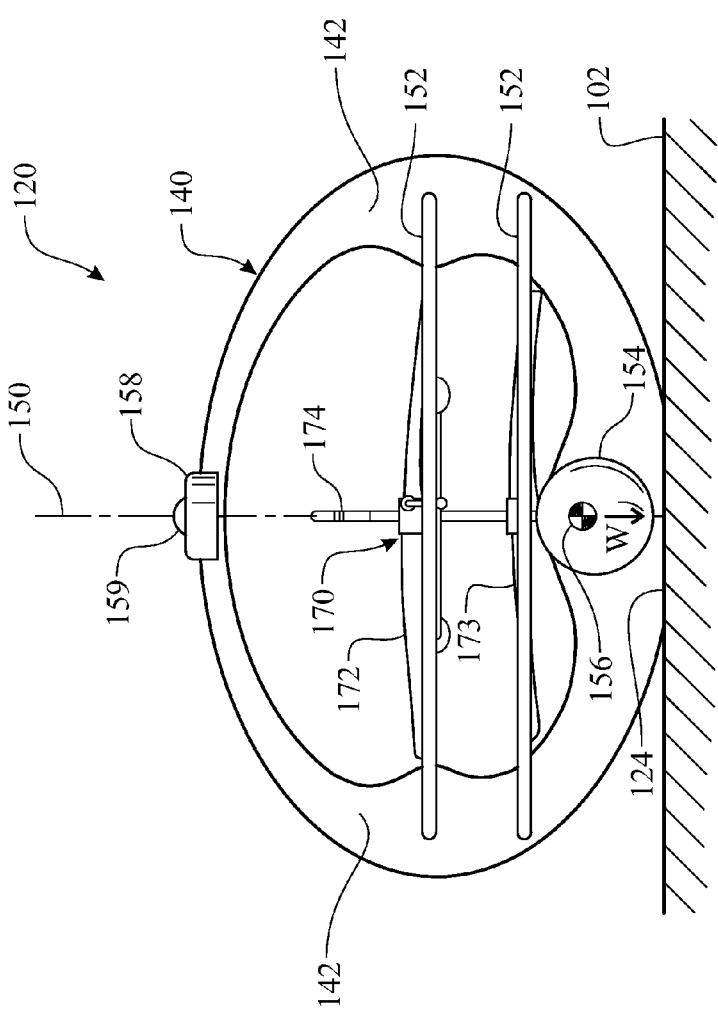
FIG. 15 presents an elevation view of the aeronautical vehicle at completion of the self-righting process.

In FIG. 15, remotely controlled aeronautical vehicle 120 has achieved a stable upright equilibrium state wherein the weighted mass 154 is most proximate to the frame assembly supporting surface 102 and wherein the flattened bottom 124 defines a resting plane on the frame assembly supporting surface 102 to maintain upright stability of the remotely controlled aeronautical vehicle 120. Once the remotely controlled aeronautical vehicle 120 has self-righted itself, the remotely controlled aeronautical vehicle 120 is once again ready to resume flight operations without requiring the user 104 to walk or travel to the location of the remotely controlled aeronautical vehicle 120 to right it prior to resuming flight.

Those skilled in the art will recognize the design options for the quantity of the vertical substantially identical vertically oriented frames 142. Additionally, the same can be considered for the number of the horizontal frames 152. The propulsion system can utilize a single rotor, a pair of counter-rotating rotors located along a common axis, multiple rotors located along either a common axis or separate axis, a jet pack, a rocket propulsion system, a ducted fan, and the like.

Those skilled in the art will recognize the potential applications of the self-righting frame assembly for use in such items as a general vehicle, a construction device, a personnel carrier, a rolling support, a toy, a paperweight, and the like.

The self-righting structural frame 140 provides a structure allowing a body having a width that is greater than a height to naturally self-orient to a desired righted position. As the weight distribution increases towards the base of the self-righting structural frame 140, the more the frame 140 can be lowered and broadened without impacting the self-righting properties.

One method of controlling flight of the remotely controlled aeronautical vehicle 120 can be accomplished by adjusting a symmetric balance thereof. Any change in balance can impact the flight of the remotely controlled aeronautical vehicle 120. A direction controlling weight 200 can be strategically placed and utilized to control a direction of motion of the remotely controlled aeronautical vehicle 120 during flight. The direction controlling weight 200 is designed to be removably attached to the remotely controlled aeronautical vehicle 120 at any suitable location. The exemplary direction controlling weight 200 includes a weight body 210 comprising a weight installation slot 212 extending inward from a distal end thereof. The direction controlling weight 200 is positioned onto the remotely controlled aeronautical vehicle 120 by resting the weight body 210 upon the upper surface of the horizontal frame 152 and sliding the weight installation slot 212 around the substantially identical vertically oriented frame 142. The gap spanning across the weight installation slot 212 is preferably of a dimension providing a snug fit against a width or thickness of the substantially identical vertically oriented frame 142. Friction between the contacting surfaces of the weight installation slot 212 and the substantially identical vertically oriented frame 142 is employed to retain the direction controlling weight 200 in position. The overall friction is determined by a relationship between a contacting surface area, a normal force and a coefficient of friction. The normal force can be increased by enabling the weight body 210 to flex, thus increasing the overall friction. The direction controlling weight 200 establishes an off-balanced condition for the remotely controlled aeronautical vehicle 120. The off-balanced condition drives the remotely controlled aeronautical vehicle 120 in a specific direction, generally in a direction towards the weighted side of the remotely controlled aeronautical vehicle 120. It is understood that the direction controlling weight 200 can be of a nominal weight, enabling the user to insert any number of direction controlling weights 200 to adjust the off-balanced condition.

Figure 18:
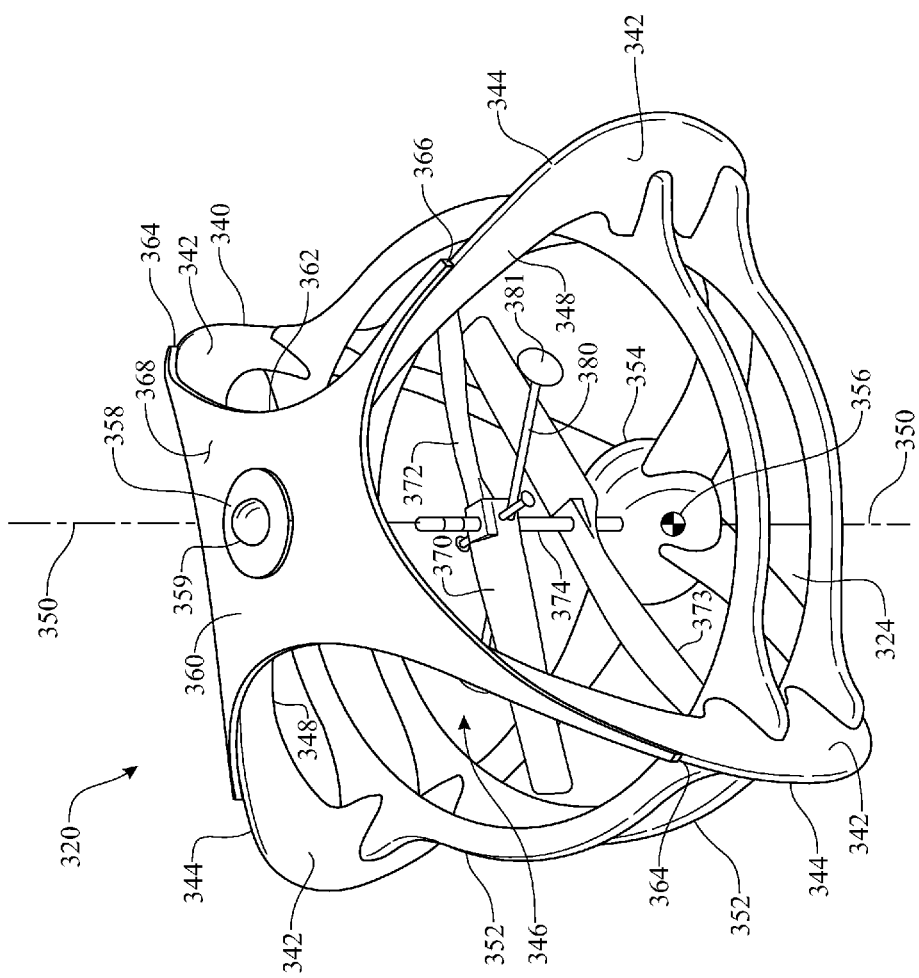
FIG. 18 presents an isometric view of a second exemplary embodiment of an aeronautical vehicle.
Figure 19:
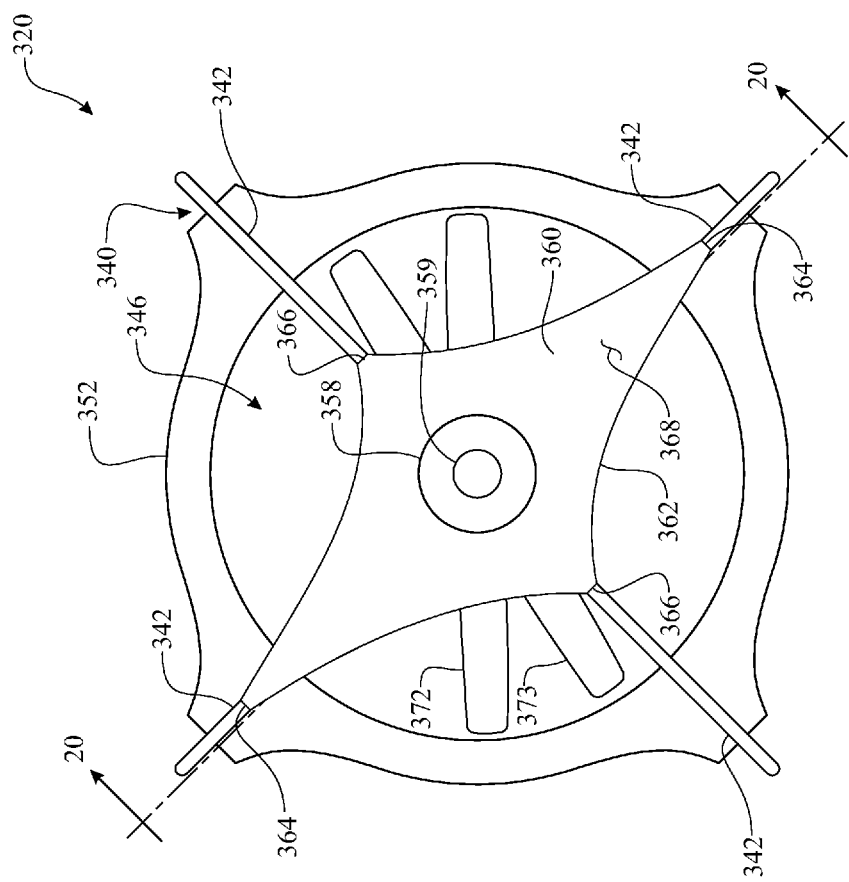
FIG. 19 presents a top plan view of the second exemplary embodiment of an aeronautical vehicle introduced in FIG. 18.
Figure 20:
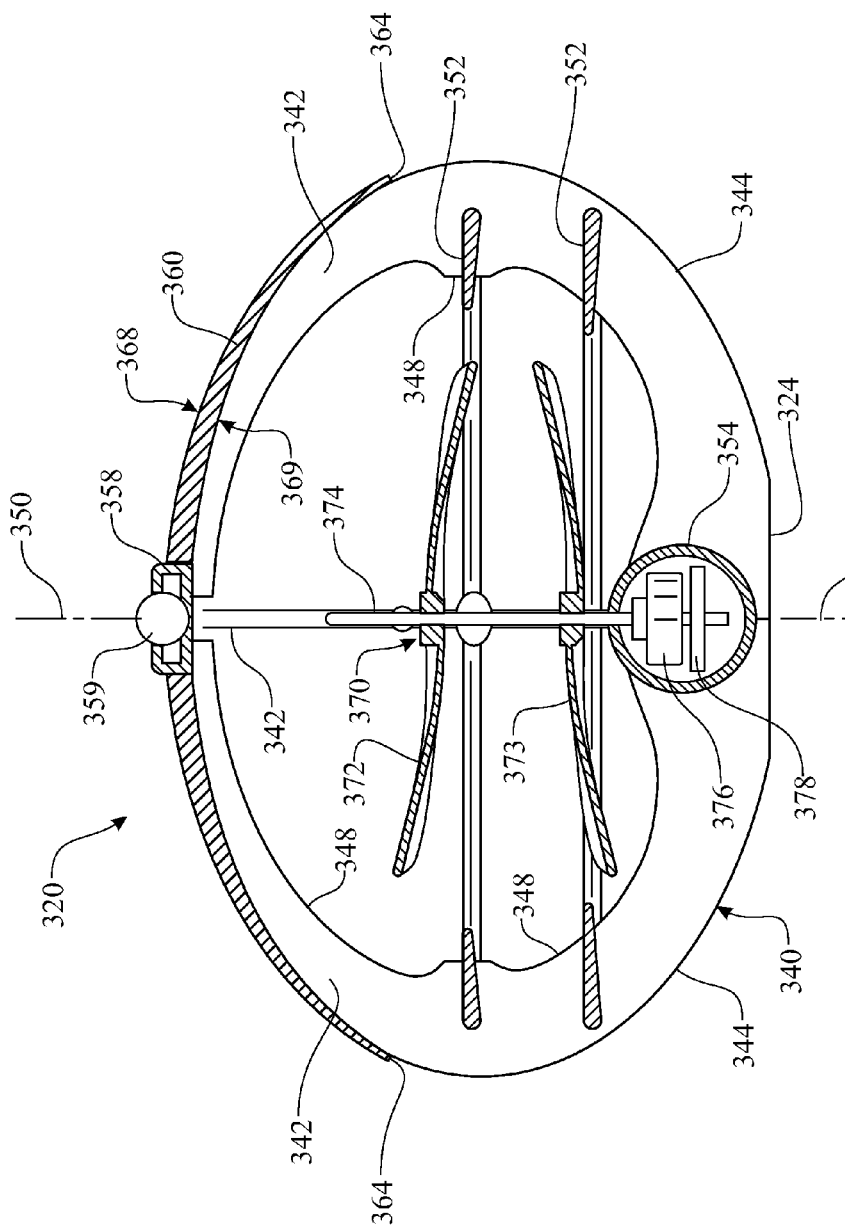
FIG. 20 presents a sectioned elevation view of the second exemplary embodiment, wherein the section is taken along section line 20-20 of FIG. 19.

The remotely controlled aeronautical vehicle 120 can be enhanced by modifying the shape of a portion, or more than one portion, of the shell structure to create additional lift, support, control, stability, or enhance other desirable features as required as illustrated in FIGS. 18 through 20. This modification is not necessarily symmetrical and could be present on any part of the shell structure, furthermore, any individual or multiple section(s) of the shell structure may be capable of independent movement and or orientation as required to enhanced desirable features or performance characteristics.

The remotely controlled aeronautical vehicle 320 comprises a significant number of elements that are the same as in the remotely controlled aeronautical vehicle 120. Like features of the remotely controlled aeronautical vehicle 320 and remotely controlled aeronautical vehicle 120 are numbered the same except preceded by the numeral '3'.

The lift and stabilization panel 360 is shaped comprising a least one arched surface, and more so, preferably designed having a cross sectional shape resembling an airfoil as illustrated in a cross sectioned view presented in FIG. 20. The airfoil shape of the lift and stabilization panel 360 provides lift when the remotely controlled aeronautical vehicle 320 is moving in a horizontal direction. The airfoil shape of the lift and stabilization panel 360 provides drag when the remotely controlled aeronautical vehicle 320 is moving in a vertical direction. The lift and stabilization panel 360 can be designed having any reasonable and suitable shape. The exemplary embodiment presents an elongated configuration, as best shown in the top plan view illustrated in FIG. 19. The lift and stabilization panel 360 is bound by a lift and stabilization panel peripheral edge 362. The lift and stabilization panel peripheral edge 362 can have any suitable shape. The exemplary span segments of the lift and stabilization panel peripheral edge 362 are concave. Alternative embodiments can include linear segments, convex segments, multi-arched segments, non-defined, free-formed segments, and the like. It is understood that the lift and stabilization panel 360 is preferably symmetric ensuring the remotely controlled aeronautical vehicle 320 retains proper balance. In the exemplary embodiment, the lift and stabilization panel 360 is elongated in a longitudinal direction. The lift and stabilization panel 360 extends in the longitudinal direction between a pair of lift and stabilization panel distal end points 364 and a lateral direction between a pair of lift and stabilization panel proximal end points 366. The lift and stabilization panel 360 defines a lift and stabilization panel upper surface 368 and a lift and stabilization panel lower surface 369. The lift and stabilization panel upper surface 368 is of a longer dimension compared to the lift and stabilization panel lower surface 369, thus creating a lift when subjected to a passing generally horizontal airflow. Conversely, the lift and stabilization panel lower surface 369 generates a drag when the remotely controlled aeronautical vehicle 320 is falling downward subjecting the lift and stabilization panel 360 to a vertical airflow. The horizontal frame 352 can also be designed having an airfoil shape, as best shown in the section view illustrated in FIG. 20. Airflow generated by the aerodynamic rotor 372 and second aerodynamic rotor 373 is drawn in around the lift and stabilization panel 360, adding to the lift and support provided by the lift and stabilization panel 360.

Figure 21:
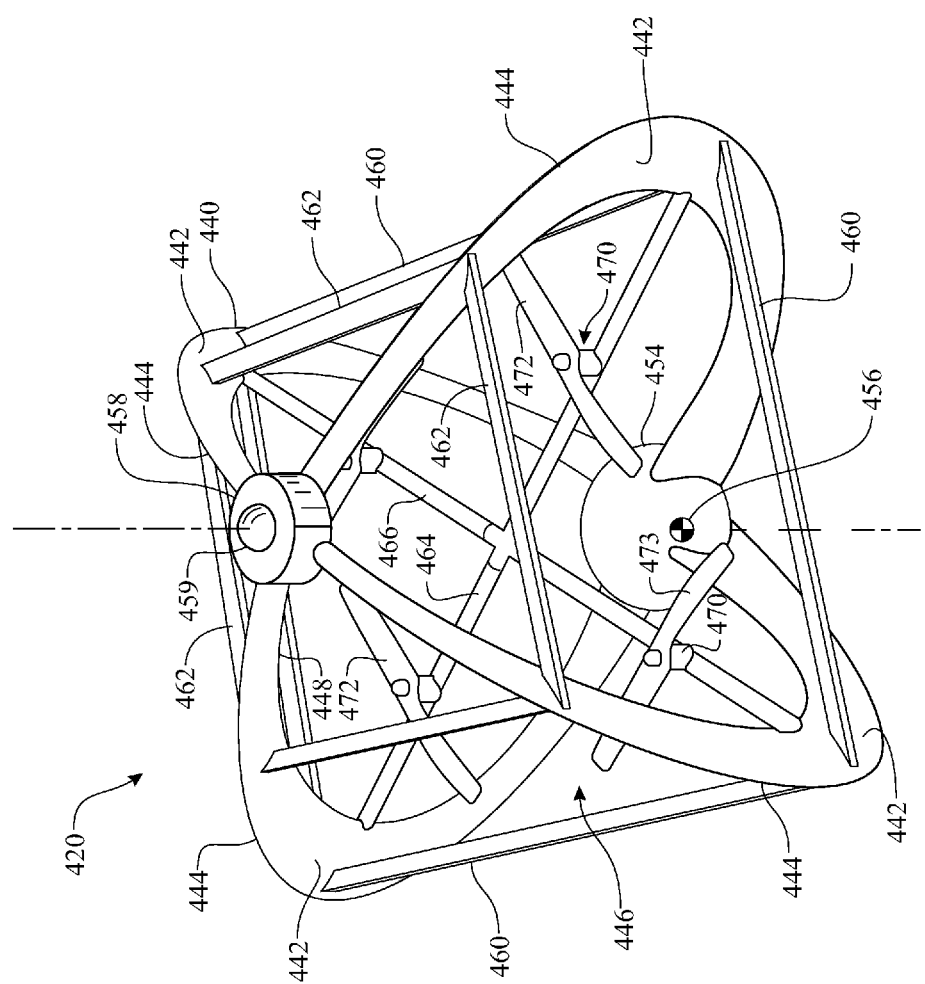
FIG. 21 presents an isometric view of a third exemplary embodiment of an aeronautical vehicle.
Figure 22:
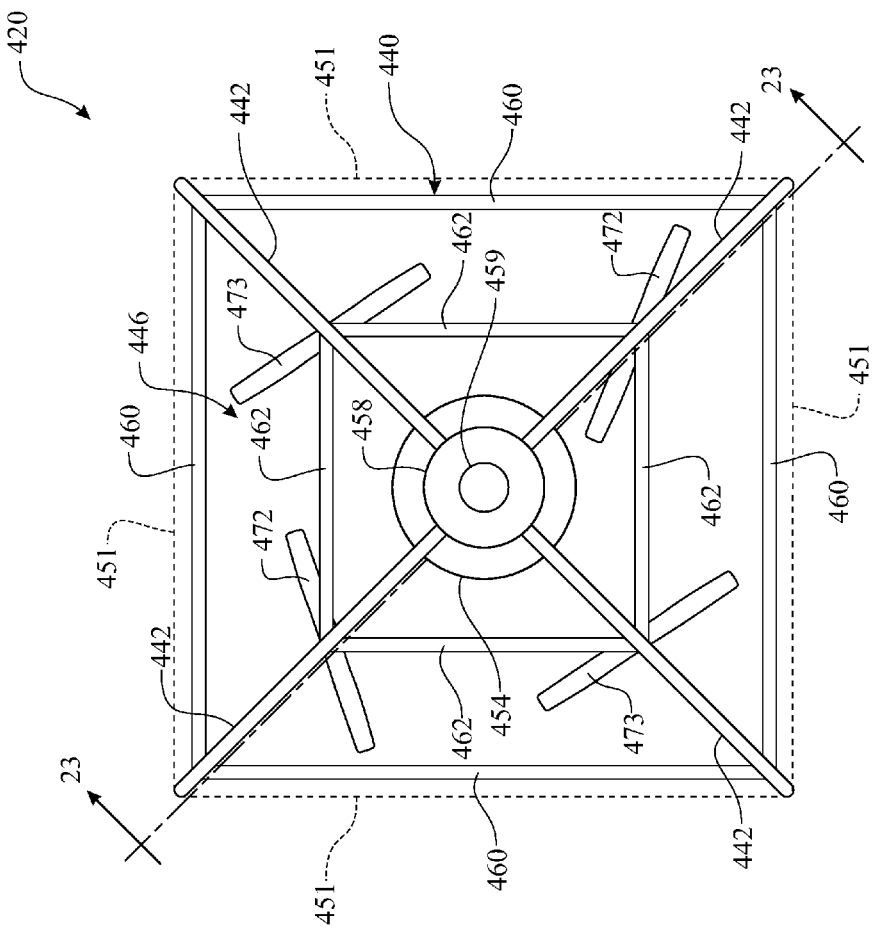
FIG. 22 presents a top plan view of the third exemplary embodiment of an aeronautical vehicle introduced in FIG. 18.
Figure 23:
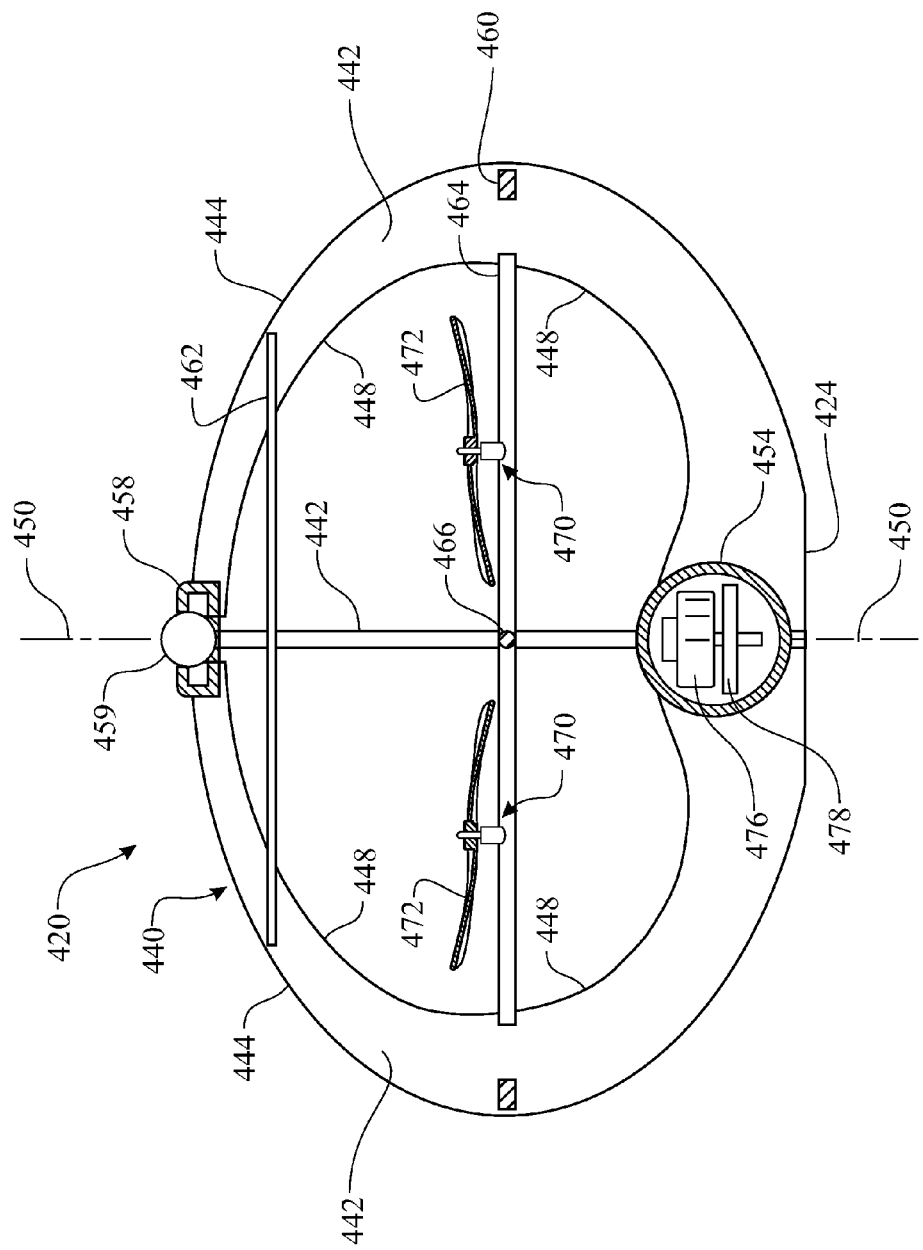
FIG. 23 presents a sectioned elevation view of the third exemplary embodiment, wherein the section is taken along section line 23-23 of FIG. 22.

Another alternative embodiment is referred to as a remotely controlled aeronautical vehicle 420, which is described by the illustrations presented in FIGS. 21 through 23. The remotely controlled aeronautical vehicle 420 comprises a significant number of elements that are the same as in the remotely controlled aeronautical vehicle 120. Like features of the remotely controlled aeronautical vehicle 420 and remotely controlled aeronautical vehicle 120 are numbered the same except preceded by the numeral '4'. The remotely controlled aeronautical vehicle 420 replaces the horizontal frame 352 with a plurality of central horizontal plane support beams 460, each central horizontal plane support beam 460 spanning between adjacent substantially identical vertically oriented frames 442. The substantially identical vertically oriented frame 442 can have any designed cross sectional shape suitable for the remotely controlled aeronautical vehicle 420. In one embodiment, the substantially identical vertically oriented frame 442 can have an airfoil shaped cross section. In another embodiment, the substantially identical vertically oriented frame 442 can have a rectangular shaped cross section. In yet another embodiment, the substantially identical vertically oriented frame 442 can have a triangular, oval, elliptical, circular, or any other suitable cross sectional shape. Each central horizontal plane support beam 460 can be linear (as illustrated), curved, concave, convex, a complex curve, and the like. Each central horizontal plane support beam 460 would be shaped to remain within an interior defined by a horizontal peripheral boundary 451. The remotely controlled aeronautical vehicle 420 can further include a second series of horizontal plane support beams, such as a secondary horizontal plane support beam 462. The second series of horizontal plane support beams can be located between the central horizontal plane support beam 460 and the protrusion 458 as illustrated or between the central horizontal plane support beam 460 and the weighted mass 454. It is also understood that additional horizontal plane support beams can be integrated into the remotely controlled aeronautical vehicle 420 at a location above and/or below the central horizontal plane support beam 460. An additional feature introduced within the remotely controlled aeronautical vehicle 420 is a plurality of traversing beams 464, 466, each traversing beam 464, 466 oriented extending between internal edges of opposing substantially identical vertically oriented frames 442 across a central void 446. The traversing beams 464, 466 can be joined at their intersection, increasing the rigidity of the remotely controlled aeronautical vehicle 420. The remotely controlled aeronautical vehicle 420 can include any or all of the central horizontal plane support beam 460, the secondary horizontal plane support beam 462, and the traversing beams 464, 466.

The traversing beams 464, 466 introduce an opportunity for integrating a plurality of spatially arranged maneuvering and lift mechanisms 470. The preferred embodiment utilizes an even number of maneuvering and lift mechanisms 470, wherein each pair of maneuvering and lift mechanism 470 employs counter rotating rotors 472, 473. More specifically, a first maneuvering and lift mechanism 470 employs a first rotating direction aerodynamic rotor 472 and a second maneuvering and lift mechanism 470 employs a second rotating direction aerodynamic rotor 473. Alternatively or in combination therewith, the remotely controlled aeronautical vehicle 420 can include any number of maneuvering and lift mechanisms 470, wherein each maneuvering and lift mechanism 470 can employ a pair of rotors, each rotor being counter rotating. Those skilled in the art can appreciate that any combination of rotating configurations can be employed to retain a rotational balance between lifting systems.

Another alternative embodiment is referred to as a remotely controlled aeronautical vehicle 520, which is described by the top view illustration presented in a FIG. 24. The remotely controlled aeronautical vehicle 520 comprises a significant number of elements that are the same as in the remotely controlled aeronautical vehicle 120. Like features of the remotely controlled aeronautical vehicle 520 and remotely controlled aeronautical vehicle 120 are numbered the same except preceded by the numeral '5'. The remotely controlled aeronautical vehicle 120, 320, 420 each include substantially identical vertically oriented frames 142, 342, 442 that extend symmetrically about a respective central vertical axis 150, 350, 450. This configuration can be modified while maintaining within the spirit and intent of the present invention by utilizing an odd number of substantially identical vertically oriented frames 542. Each substantially identical vertically oriented frame 542 extends radially outward from the central vertical axis 550. The substantially identical vertically oriented frames 542 are preferably arranged at equal angles from one another. A horizontal frame 552 or similar element is employed to provide rigidity and structural support to the distal ends of the substantially identical vertically oriented frames 542.

The embodiments described above described each of the vertically oriented frames 142, 342, 442, 542 being as substantially identical. The vertically oriented frames 142, 342, 442, 542 are preferred to be identical for balance. It is understood that the vertically oriented frames 142, 342, 442, 542 can differ from one to another as long as the self-righting frame assembly 140, 340, 440, 540 is suitably balanced for flight. Similarly, the arrangement of the vertically oriented frames 142, 342, 442, 542 are described as being separated by equal angles. It is understood that the vertically oriented frames 142, 342, 442, 542 can be arranged at varying spacing or angles from one to another as long as the self-righting frame assembly 140, 340, 440, 540 is suitably balanced for flight.

It is understood that a portion of the shell structure may in fact be capable of independent movement and varying orientation (similar to an aileron as a sub-component capable of independent movement from a wing) as required for performance, control or other desirable feature as required.

The self-righting frame assembly 140, 340, 440, 540 can further incorporate elements commonly used in aviation, including ailerons, a rudder, elevators, and the like to improve flight control. These can be controlled using any suitable control elements known by those skilled in the art for both radio controlled vehicles as well as manned vehicles.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

Reference Element Descriptions

| Ref. No. | Description |
|---|---|
| 102 | surface |
| 104 | user |
| 106 | remote hand controller |
| 108 | case |
| 110 | handles |
| 111 | on-off switch |
| 112 | joy sticks |
| 113 | joy sticks |
| 114 | power cord |
| 120 | remotely controlled aeronautical vehicle |
| 122 | top portion |
| 124 | flattened bottom |
| 140 | self-righting frame assembly |
| 142 | substantially identical vertically oriented frames |
| 144 | circular shaped outer curved edge |
| 146 | central void |
| 148 | inner edge |
| 150 | central vertical axis |
| 152 | horizontal frame |
| 154 | weighted mass |
| 156 | center of gravity |
| 158 | protrusion |
| 159 | spherical portion |
| 170 | maneuvering and lift mechanism |
| 172 | aerodynamic rotor |
| 173 | second aerodynamic rotor |
| 174 | mast |
| 176 | power supply |
| 178 | remote control electronics |
| 180 | stabilizer bar |
| 181 | weights |
| 186 | major axis (represented by dimension "a") |
| 187 | minor axis (represented by dimension "b") |
| 188 | weight vector |
| 189 | moment force "M" |
| 190 | angle "A" |
| 191 | dimension "X" |
| 192 | dimension "Y" |
| 193 | dimensional distance of "Z" |
| 194 | contact point |
| 195 | frame contact points |
| 200 | direction controlling weight |
| 210 | weight body |
| 212 | weight installation slot |
| 320 | remotely controlled aeronautical vehicle |
| 322 | top portion |
| 324 | flattened bottom |
| 340 | self-righting frame assembly |
| 342 | substantially identical vertically oriented frames |
| 344 | circular shaped outer curved edge |
| 346 | central void |
| 348 | inner edge |
| 350 | central vertical axis |
| 352 | horizontal frame |
| 354 | weighted mass |
| 356 | center of gravity |
| 358 | protrusion |
| 359 | spherical portion |
| 360 | lift and stabilization element |
| 362 | lift and stabilization panel peripheral edge |
| 364 | lift and stabilization panel distal end point |
| 366 | lift and stabilization panel proximal end point |
| 368 | lift and stabilization panel upper surface |
| 369 | lift and stabilization panel lower surface |
| 370 | maneuvering and lift mechanism |
| 372 | aerodynamic rotor |
| 373 | second aerodynamic rotor |
| 374 | mast |
| 376 | power supply |
| 378 | remote control electronics |
| 380 | stabilizer bar |
| 381 | weights |
| 386 | major axis (represented by dimension "a" |
| 387 | minor axis (represented by dimension "b" |
| 388 | weight vector |
| 420 | remotely controlled aeronautical vehicle |
| 422 | top portion |
| 424 | flattened bottom |
| 424 | flattened bottom |
| 440 | self-righting frame assembly |
| 442 | substantially identical vertically oriented frame |
| 444 | circular shaped outer curved edge |
| 446 | central void |
| 448 | inner edge |
| 450 | central vertical axis |
| 451 | horizontal peripheral boundary |
| 452 | horizontal frame |
| 454 | weighted mass |
| 456 | center of gravity |
| 458 | protrusion |
| 459 | spherical portion |
| 460 | central horizontal plane support beam |
| 462 | secondary horizontal plane support beam |
| 464 | first central traversing beam |
| 466 | second central traversing beam |
| 470 | maneuvering and lift mechanism |
| 472 | first rotating direction aerodynamic rotor |
| 473 | second rotating direction aerodynamic rotor |
| 474 | mast |
| 476 | power supply |
| 478 | remote control electronics |
| 480 | stabilizer bar |
| 481 | weights |

-continued

| Reference Element Descriptions | |
|---|---|
| Ref. No. | Description |
| 486 | major axis (represented by dimension "a") |
| 487 | minor axis (represented by dimension "b") |
| 488 | weight vector |
| 520 | remotely controlled aeronautical vehicle |
| 522 | top portion |
| 540 | self-righting frame assembly |
| 542 | substantially identical vertically oriented frame |
| 544 | circular shaped outer curved edge |
| 546 | central void |
| 548 | inner edge |
| 550 | central vertical axis |
| 551 | horizontal peripheral boundary |
| 552 | horizontal frame |
| 554 | weighted mass |
| 556 | center of gravity |
| 558 | protrusion |
| 559 | spherical portion |
| 560 | central horizontal plane support beam |
| 562 | upper horizontal plane support beam |
| 564 | first central traversing beam |
| 566 | second central traversing beam |
| 570 | maneuvering and lift mechanism |
| 572 | first rotating direction aerodynamic rotor |
| 573 | second rotating direction aerodynamic rotor |
| 574 | mast |
| 576 | power supply |
| 578 | remote control electronics |
| 580 | stabilizer bar |
| 581 | weights |
| 586 | major axis (represented by dimension "a") |
| 587 | minor axis (represented by dimension "b") |
| 588 | weight vector |

What is claimed is:

1. A self-righting aeronautical vehicle, comprising:
a self-righting frame assembly having a plurality of frame members, the frame members being arranged in a fixed spatial relationship providing a passageway for airflow into and from an interior void,
at least a portion of the plurality of frame members form at least one dome shaped section;
at least one of an apex and a protrusion located generally centered within the at least one dome shaped section,
a propulsion system located within the interior void,
wherein, the at least one of the apex and the protrusion providing an initial instability to begin a self-righting process when said frame assembly is placed on a generally horizontal surface oriented having the at least one of the apex and the protrusion contacting the generally horizontal surface.

2. The self-righting aeronautical vehicle as recited in claim 1, wherein the self-righting aeronautical vehicle is adapted to be instable when the self-righting aeronautical vehicle contacts the generally horizontal surface from flight.

3. The self-righting aeronautical vehicle as recited in claim 1, wherein at least a portion of the plurality of frame members have an elongated shape.

4. The self-righting aeronautical vehicle as recited in claim 1, wherein at least a portion of the plurality of frame members form a substantially continuous looped shape.

5. The self-righting aeronautical vehicle as recited in claim 1, wherein the propulsion system is adapted to contribute to the self-righting process.

6. The self-righting aeronautical vehicle as recited in claim 1, comprising
the apex, wherein the apex is located generally centered within the at least one dome shaped section,
wherein, the apex provides the initial instability to begin a self-righting process when said frame assembly is placed on a generally horizontal surface oriented having the at least one of the apex and the protrusion contacting the generally horizontal surface.

7. The self-righting aeronautical vehicle as recited in claim 1, comprising
the protrusion, wherein the protrusion is located generally centered within the at least one dome shaped section,
wherein, the protrusion provides the initial instability to begin a self-righting process when said frame assembly is placed on a generally horizontal surface oriented having the at least one of the protrusion and the protrusion contacting the generally horizontal surface.

8. A self-righting aeronautical vehicle, comprising:
a self-righting frame assembly having a plurality of frame members, the frame members being arranged in a fixed spatial relationship providing a passageway for airflow into and from an interior void,
at least a portion of the plurality of frame members form at least one dome shaped section;
at least one of an apex and a protrusion located generally centered within the at least one dome shaped section,
a propulsion system located within the interior void,
wherein, the at least one of the apex and the protrusion providing an initial instability to begin a self-righting process when said frame assembly is placed on a generally horizontal surface oriented having the at least one of the apex and the protrusion contacting the generally horizontal surface,
wherein upon completion of a self righting process of the self-righting frame assembly, the propulsion system is oriented within the self-righting frame assembly to provide a lift force to the self-righting aeronautical vehicle.

9. The self-righting aeronautical vehicle as recited in claim 8, wherein the self-righting aeronautical vehicle is adapted to be instable when the self-righting aeronautical vehicle contacts the generally horizontal surface from flight.

10. The self-righting aeronautical vehicle as recited in claim 8, wherein at least a portion of the plurality of frame members have an elongated shape.

11. The self-righting aeronautical vehicle as recited in claim 8, wherein at least a portion of the plurality of frame members form a substantially continuous looped shape.

12. The self-righting aeronautical vehicle as recited in claim 8, wherein the propulsion system is adapted to contribute to the self-righting process.

13. The self-righting aeronautical vehicle as recited in claim 8, comprising
the apex, wherein the apex is located generally centered within the at least one dome shaped section,
wherein, the apex provides the initial instability to begin a self-righting process when said frame assembly is placed on a generally horizontal surface oriented having the at least one of the apex and the protrusion contacting the generally horizontal surface.

14. The self-righting aeronautical vehicle as recited in claim 8, comprising
the protrusion, wherein the protrusion is located generally centered within the at least one dome shaped section,
wherein, the protrusion provides the initial instability to begin a self-righting process when said frame assembly is placed on a generally horizontal surface oriented having the at least one of the protrusion and the protrusion contacting the generally horizontal surface.

15. A self-righting aeronautical vehicle, comprising:
a self-righting frame assembly having a plurality of frame members, the frame members being arranged in a fixed spatial relationship providing a passageway for airflow into and from an interior void,
the frame members having at least one arched section;
at least one of an apex and a protrusion located generally centered within the at least one arched section,
a propulsion system located within the interior void,
wherein, the at least one of an apex and a protrusion providing an initial instability to begin a self-righting process when said frame assembly is placed on a generally horizontal surface oriented having the at least one of an apex and a protrusion contacting the generally horizontal surface,
wherein upon completion of a self righting process of the self-righting frame assembly, the propulsion system is oriented in a substantially vertical orientation.

16. The self-righting aeronautical vehicle as recited in claim 15, wherein the self-righting aeronautical vehicle is adapted to be instable when the self-righting aeronautical vehicle contacts the generally horizontal surface from flight.

17. The self-righting aeronautical vehicle as recited in claim 15, wherein at least a portion of the plurality of frame members have an elongated shape.

18. The self-righting aeronautical vehicle as recited in claim 15, wherein at least a portion of the plurality of frame members form a substantially continuous looped shape.

19. The self-righting aeronautical vehicle as recited in claim 15, wherein the propulsion system is adapted to contribute to the self-righting process.

20. The self-righting aeronautical vehicle as recited in claim 15, comprising
the apex, wherein the apex is located generally centered within the at least one dome shaped section,
wherein, the apex provides the initial instability to begin a self-righting process when said frame assembly is placed on a generally horizontal surface oriented having the at least one of the apex and the protrusion contacting the generally horizontal surface.

21. The self-righting aeronautical vehicle as recited in claim 15, comprising
the protrusion, wherein the protrusion is located generally centered within the at least one dome shaped section,
wherein, the protrusion provides the initial instability to begin a self-righting process when said frame assembly is placed on a generally horizontal surface oriented having the at least one of the protrusion and the protrusion contacting the generally horizontal surface.

* * * * *